United States Patent [19]

Takahashi

[11] Patent Number: 4,621,910

[45] Date of Patent: Nov. 11, 1986

[54] OBJECTIVE FOR AN ENDOSCOPE

[75] Inventor: Susumu Takahashi, Tokyo, Japan

[73] Assignee: Olympus Optical Co., Ltd., Tokyo, Japan

[21] Appl. No.: 617,735

[22] Filed: Jun. 6, 1984

[30] Foreign Application Priority Data

Jun. 8, 1983 [JP] Japan ................... 58-100856

[51] Int. Cl.⁴ .................... G02B 9/34; G02B 9/60
[52] U.S. Cl. ................................ 350/469; 350/465
[58] Field of Search ............ 350/469, 410, 414, 465

[56] References Cited

U.S. PATENT DOCUMENTS 4,025,155  5/1977  Imai.

Primary Examiner—John K. Corbin
Assistant Examiner—Rebecca D. Gass
Attorney, Agent, or Firm—Cushman, Darby & Cushman

[57] ABSTRACT

An objective for an endoscope which is to be used in an endoscope employing relay lenses and comprises, in the order from the object side, a negative lens unit, a positive lens unit and a lens unit comprising a meniscus lens arranged to be concave toward the object side, the objective for an endoscope being arranged that the dispersion in the field angle is small and arranged to be capable of correcting curvature of field of the endoscope optical system as a whole satisfactorily favorably.

24 Claims, 25 Drawing Figures

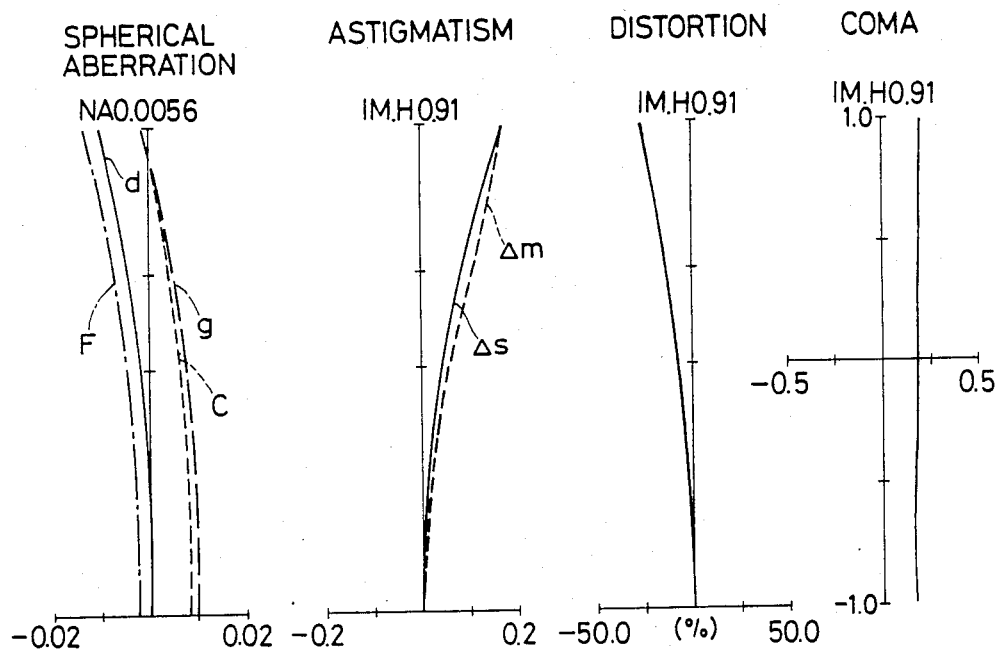
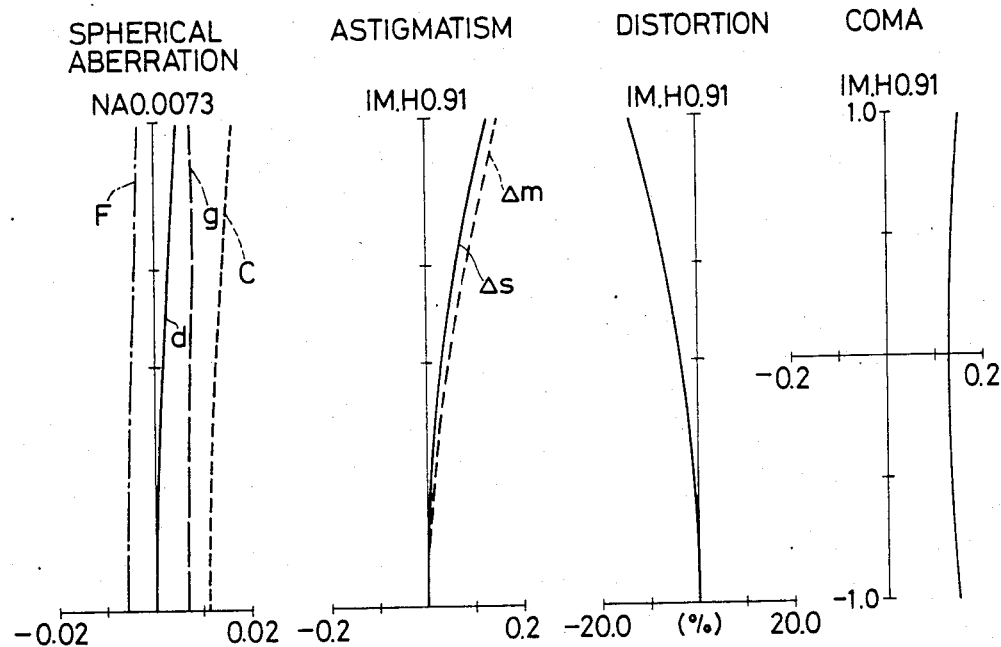

OBJECTIVE FOR AN ENDOSCOPE

BACKGROUND OF THE INVENTION (a) Field of the Invention

The present invention relates to an objective for an endoscope and, more particularly, to an objective for an endoscope employing relay lenses (endoscope arranged to transmit the image of object, which is formed by the objective, by using relay lenses).

(b) Description of the Prior Art

There is a known optical system for an endoscope employing relay lenses which is arranged that the image of object focused by an objective O is formed in the inside of field lens F as shown in FIG. 1 and aberrations thereof are corrected favourably. This type of endoscope optical system employing relay lenses has features as described in the following: (1) the exit pupil of the objective O is transmitted to the relay lens system comprising the relay lenses $R_1$, $R_2$ and $R_3$ by using the field lens F, (2) the objective is arranged as a retrofocus type objective so that positive curvature of field is caused in the image formed by the objective so as to thereby cancel negative curvature of field caused by respective relay lenses constituting the relay lens system in order to thereby eliminate curvature of field of the endoscope optical system as a whole, and (3) a cemented doublet having a cemented surface R, which has negative refractive power, is provided as one of positive lens components constituting the objective O, which is arranged as a retrofocus type objective, so that coma of the endoscope optical system as a whole is corrected favourably.

However, the known endoscope optical system shown in the above has disadvantages described in the following. Firstly, dispersion in the field angle occurs in the course of manufacture of said endoscope optical system. Said dispersion in the field angle is caused by dispersion in the action to transmit the pupil by the field lens F. That is, dispersion in the action to transmit the pupil by the field lens F is caused by dispersion in the airspace between the objective O and field lens F, dispersion in the airspace between the field lens F and relay lens system, dispersion in the thickness of field lens, etc. and, consequently, dispersion is caused in the field angle of the endoscope optical system.

The second disadvantage of the known endoscope optical system employing relay lenses is that curvature of field is not yet corrected satisfactorily favourably. Curvature of field caused by the relay lens system is proportional to the number of relay lenses ($R_1$, $R_2$, $R_3$, etc.) which constitute the relay lens system. Therefore, even when negative curvature of field caused by the relay lens system is favourably corrected by means of positive curvature of field caused by the objective in case that the number of relay lenses is three, for example, said negative curvature of field cannot be corrected satisfactorily and remains undercorrected in case that the number of relay lenses is five.

SUMMARY OF THE INVENTION

It is, therefore, a primary object of the present invention to provide an objective for an endoscope employing relay lenses which is free from dispersion in the field angle and which serves to correct curvature of field of the endoscope optical system as a whole satisfactorily favourably.

FIG. 2 shows an endoscope optical system employing relay lenses which is provided with the objective according to the present invention wherein reference symbol O represents the objective, and reference symbols $R_1$, $R_2$, $R_3$, . . . respectively represent relay lenses. As shown in FIG. 2, the field lens F is not used in said endoscope optical system and, instead of the above, the objective is arranged to have such lens configuration that it comprises a meniscus lens which is concave toward the object side and located on the image side therein (in front of the image position). That is, the objective according to the present invention comprises, as shown in FIG. 2, a negative lens unit $L_1$, a positive lens group $L_2$, and lens unit $L_3$ comprising a meniscus lens which is concave toward the object side.

The objective having the above-mentioned lens configuration is arranged that the principal rays diverged or converged in front of the lens unit $L_3$, which is a meniscus lens, are made approximately parallel with the optical axis by means of the lens unit $L_3$, which is a meniscus lens, and the exit pupil of the objective is thereby transmitted to the relay lens system so that the exit pupil comes to a position approximately at the infinite distance. As the objective O is composed to form a so-called telecentric system which transmits the pupil to the relay lens system so tht the pupil comes to a position of infinite distance as explained in the above, variation in the airspace between the objective and relay lens system does not have any influence on the field angle of the endoscope optical system and, therefore, it is possible to obtain an endoscope optical system employing relay lenses for which the dispersion in the field angle is minimized.

Besides, as the objective according to the present invention comprises a meniscus lens (lens unit $L_3$) with Petzval's sum of negative value, Petzval's sum of the objective becomes a negative value with a larger absolute value compared with the known objective for an endoscope and, consequently, the objective causes positive curvature of field which is larger than that of the known objective. Therefore, it is possible to more favourably correct curvature of field of the endoscope optical system employing relay lenses as a whole.

Here, when the lens unit $L_3$ which is a meniscus lens is provided, Petzval's sum becomes negative when the following condition (1) is fulfilled:

$$\frac{n_a - 1}{n_a} \cdot \frac{1}{R_a} + \frac{1 - n_b}{n_b} \cdot \frac{1}{R_b} < 0 \qquad (1)$$

where, reference symbols $n_a$ and $n_b$ respectively represent refractive indices of the front and rear lens elements in the lens unit $L_3$, and reference symbols $R_a$ and $R_b$ respectively represent radii of curvature of the surface on the object side and surface on the image side of the lens unit $L_3$. When the meniscus lens is arranged as a single lens, it becomes $n_a = n_b$.

When the above-mentioned condition (1) is not fulfilled, curvature of field of the endoscope optical system as a whole cannot be corrected favourably.

When it is arranged that the above-mentioned radii of curvature $R_a$ and $R_b$ fulfill the condition (2) shown below, it is preferable for correcting curvature of field more favourably.

$$0.45 < \frac{R_a}{R_b} < 0.9 \qquad (2)$$

When $R_a/R_b$ becomes larger than the upper limit of the condition (2), the negative power of the meniscus lens (lens unit $L_3$) becomes weak. As a result, the action to correct Petzval's sum becomes weak and it is impossible to correct curvature of field satisfactorily. When $R_a/R_b$ becomes smaller than the lower limit of the condition (2), the negative power of the meniscus lens (lens unit $L_3$) becomes strong, and this is advantageous for making Petzval's sum small. However, the diverging action of said meniscus lens for offaxial upper rays becomes strong, and coma will become unbalanced.

As described in the above, the objective according to the present invention enables to minimize the dispersion in the field angle of the endoscope optical system by providing the meniscus lens (lens unit $L_3$) and, at the same time, thereby enables to favourably correct curvature of field of the endoscope optical system.

By adopting the lens configuration as shown in FIG. 2, the objective according to the present invention also enables to favourably correct coma secondarily. That is, in case of the known objective shown in FIG. 1, coma is corrected in balanced state by means of only one surface, i.e., the cemented surface R. On the other hand, in case of the objective according to the present invention, it is possible to correct coma by means of two surfaces, i.e., the front surface of the meniscus lens (lens unit $L_3$) having negative refractive power and cemented surface R in the positive lens unit $L_2$. Therefore, it is possible to make the radius of curvature of the above-mentioned cemented surface R large. As a result, it is also possible to improve the curve of coma and, consequently, to correct coma favourably.

For correction of coma, it is preferable to establish the conditions (3) and (4) shown below. By these conditions, it is possible to make the balance and curve of coma favourable.

$$0.4 < \frac{|f_1|}{f} < 0.75 \quad (3)$$

$$0.75 < \frac{|R_c|}{f} < 2.6 \quad (4)$$

In the conditions shown in the above, reference symbol f represents the focal length of the objective as a whole, reference symbol $f_1$ represents the focal length of the negative lens unit $L_1$, and reference symbol $R_c$ represents the radius of curvature of the cemented surface in the positive lens unit $L_2$.

Coma will be undercorrected when $|f_1|/f$ and/or $|R_c|/f$ become larger than the upper limits of the conditions (3) and/or (4) and will be overcorrected when $|f_1|/f$ and/or $|R_c|/f$ become smaller than the lower limits of the conditions (3) and/or (4). Besides, coma willl become unbalanced when $|f_1|/f$ and/or $|R_c|/f$ become larger than the upper limits or smaller than the lower limits of the conditions (3) and/or (4).

BRIEF DESCRIPTION OF THE DRAWINGS

FIGS. 11 through 25 respectively show graphs illustrating aberration curves of Embodiment 1 through 15 of the objective according to the present invention.

DETAILED DESCRIPTION OF THE PREFERRED EMBODIMENTS

Figure 1:
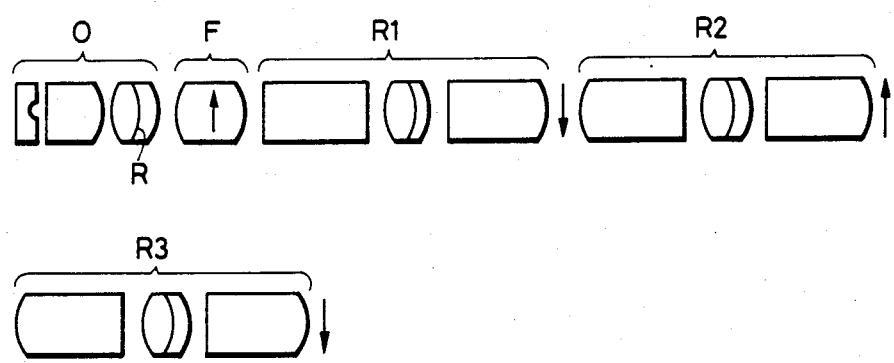
FIG. 1 shows a sectional view of an endoscope optical system employing relay lenses and comprising a known objective.
Figure 2:
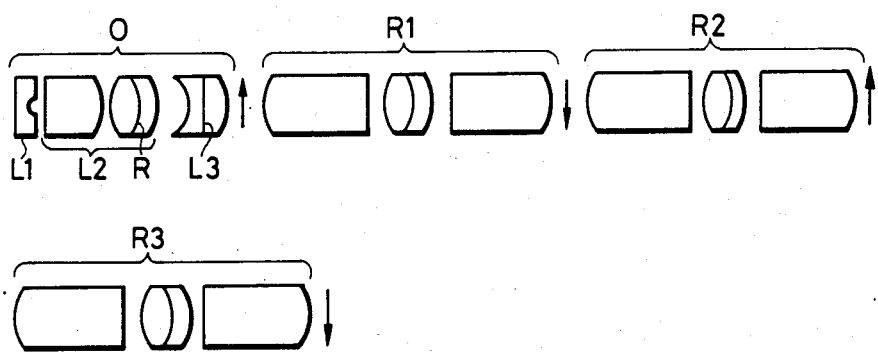
FIG. 2 shows a sectional view of an endoscope optical system employing relay lenses and comprising the objective according to the present invention.

Now, preferred embodiments of the objective for an endoscope according to the present invention are shown below.

| Embodiment 1 | | | |
|---|---|---|---|
| $r_1 = \infty$ | | | |
| | $d_1 = 0.2000$ $n_1 = 1.78800$ | $\nu_1 = 47.43$ | |
| $r_2 = 0.6540$ | | | |
| | $d_2 = 0.3000$ | | |
| $r_3 = \infty$ | | | |
| | $d_3 = 5.16$ $n_2 = 1.78800$ | $\nu_2 = 47.43$ | |
| $r_4 = -2.4390$ | | | |
| | $d_4 = 0.1000$ | | |
| $r_5 = 3.6000$ | | | |
| | $d_5 = 1.7700$ $n_3 = 1.63854$ | $\nu_3 = 55.38$ | |
| $r_6 = -1.7490$ | | | |
| | $d_6 = 0.7000$ $n_4 = 1.84666$ | $\nu_4 = 23.88$ | |
| $r_7 = -9.0340$ | | | |
| | $d_7 = 1.2000$ | | |
| $r_8 = -1.8270$ | | | |
| | $d_8 = 0.7000$ $n_5 = 1.72825$ | $\nu_5 = 28.46$ | |
| $r_9 = \infty$ | | | |
| | $d_9 = 1.3900$ $n_6 = 1.77250$ | $\nu_6 = 49.66$ | |
| $r_{10} = -2.5920$ | | | |

$$f = 1.27, \quad \frac{|f_1|}{f} = 0.65$$

$$\frac{|R_c|}{f} = \frac{|r_6|}{f} = 1.37, \quad \frac{R_a}{R_b} = \frac{r_8}{r_{10}} = 0.70$$

$$\frac{n_a - 1}{n_a} \cdot \frac{1}{R_a} + \frac{1 - n_b}{n_b} \cdot \frac{1}{R_b} =$$

$$\frac{n_5 - 1}{n_5} \cdot \frac{1}{r_8} + \frac{1 - n_6}{n_6} \cdot \frac{1}{r_{10}} = -0.062$$

| Embodiment 2 | | | |
|---|---|---|---|
| $r_1 = \infty$ | | | |
| | $d_1 = 0.2000$ $n_1 = 1.78800$ | $\nu_1 = 47.43$ | |
| $r_2 = 0.9070$ | | | |
| | $d_2 = 0.3000$ | | |
| $r_3 = \infty$ | | | |
| | $d_3 = 6.8$ $n_2 = 1.80610$ | $\nu_2 = 40.95$ | |
| $r_4 = -3.0700$ | | | |
| | $d_4 = 0.5000$ | | |
| $r_5 = 5.6020$ | | | |
| | $d_5 = 1.7400$ $n_3 = 1.64000$ | $\nu_3 = 60.09$ | |
| $r_6 = -2.4830$ | | | |
| | $d_6 = 0.4300$ $n_4 = 1.84666$ | $\nu_4 = 23.88$ | |
| $r_7 = -17.4420$ | | | |
| | $d_7 = 2.9200$ | | |

-continued

Embodiment 2

$r_8 = -2.1630$
$\quad d_8 = 1.0000 \quad n_5 = 1.62004 \quad \nu_5 = 36.25$
$r_9 = \infty$
$\quad d_9 = 0.9800 \quad n_6 = 1.78800 \quad \nu_6 = 47.43$
$r_{10} = -3.1440$ $f = 1.80, \quad \dfrac{|f_1|}{f} = 0.63$ $\dfrac{|R_c|}{f} = \dfrac{|r_6|}{f} = 1.37, \quad \dfrac{R_a}{R_b} = \dfrac{r_8}{r_{10}} = 0.68$ $\dfrac{n_a - 1}{n_a} \dfrac{1}{R_a} + \dfrac{1 - n_b}{n_b} \dfrac{1}{R_b} =$ $\dfrac{n_5 - 1}{n_5} \dfrac{1}{r_8} + \dfrac{1 - n_6}{n_6} \dfrac{1}{r_{10}} = -0.037$

Embodiment 3

$r_1 = \infty$
$\quad d_1 = 0.2000 \quad n_1 = 1.78800 \quad \nu_1 = 47.43$
$r_2 = 0.6800$
$\quad d_2 = 0.3000$
$r_3 = \infty$
$\quad d_3 = 4.97 \quad n_2 = 1.78800 \quad \nu_2 = 47.43$
$r_4 = -2.3820$
$\quad d_4 = 0.3100$
$r_5 = 4.6400$
$\quad d_5 = 1.8400 \quad n_3 = 1.63854 \quad \nu_3 = 55.38$
$r_6 = -1.7990$
$\quad d_6 = 0.6000 \quad n_4 = 1.84666 \quad \nu_4 = 23.88$
$r_7 = -8.0150$
$\quad d_7 = 1.8300$
$r_8 = -1.7750$
$\quad d_8 = 0.5000 \quad n_5 = 1.72825 \quad \nu_5 = 28.46$
$r_9 = \infty$
$\quad d_9 = 2.2000 \quad n_6 = 1.77250 \quad \nu_6 = 49.66$
$r_{10} = -2.7600$ $f = 1.69, \quad \dfrac{|f_1|}{f} = 0.51$ $\dfrac{|R_c|}{f} = \dfrac{|r_6|}{f} = 1.06, \quad \dfrac{R_a}{R_b} = \dfrac{r_6}{r_{10}} = 0.64$ $\dfrac{n_a - 1}{n_a} \dfrac{1}{R_a} + \dfrac{1 - n_b}{n_b} \dfrac{1}{R_b} =$ $\dfrac{n_5 - 1}{n_5} \dfrac{1}{r_8} + \dfrac{1 - n_6}{n_6} \dfrac{1}{r_{10}} = -0.079$

Embodiment 4

$r_1 = \infty$
$\quad d_1 = 0.2000 \quad n_1 = 1.78800 \quad \nu_1 = 47.43$
$r_2 = 0.5900$
$\quad d_2 = 0.3000$
$r_3 = \infty$
$\quad d_3 = 3.35 \quad n_2 = 1.78800 \quad \nu_2 = 47.43$
$r_4 = -1.9990$
$\quad d_4 = 0.3000$
$r_5 = 7.0690$
$\quad d_5 = 1.9435 \quad n_3 = 1.64000 \quad \nu_3 = 60.09$
$r_6 = -1.4710$
$\quad d_6 = 0.5000 \quad n_4 = 1.84666 \quad \nu_4 = 23.88$
$r_7 = -3.1560$
$\quad d_7 = 1.8785$
$r_8 = -1.4710$
$\quad d_8 = 0.5000 \quad n_5 = 1.72825 \quad \nu_5 = 28.46$
$r_9 = \infty$
$\quad d_9 = 1.9902 \quad n_6 = 1.77250 \quad \nu_6 = 49.66$
$r_{10} = -2.6380$ $f = 1.78, \quad \dfrac{|f_1|}{f} = 0.42,$ -continued

Embodiment 4

$\dfrac{|R_c|}{f} = \dfrac{|r_6|}{f} = 1.82, \quad \dfrac{R_a}{R_b} = \dfrac{r_8}{r_{10}} = 0.55,$ $\dfrac{n_a - 1}{n_a} \dfrac{1}{R_a} + \dfrac{1 - n_b}{n_b} \dfrac{1}{R_b} =$ $\dfrac{n_5 - 1}{n_5} \dfrac{1}{r_8} + \dfrac{1 - n_6}{n_6} \dfrac{1}{r_{10}} = -0.121$

Embodiment 5

$r_1 = \infty$
$\quad d_1 = 0.2000 \quad n_1 = 1.80610 \quad \nu_1 = 40.95$
$r_2 = 0.7330$
$\quad d_2 = 0.3000$
$r_3 = \infty$
$\quad d_3 = 4.93 \quad n_2 = 1.80610 \quad \nu_2 = 40.95$
$r_4 = -2.2750$
$\quad d_4 = 0.1000$
$r_5 = 3.5180$
$\quad d_5 = 1.5900 \quad n_3 = 1.64000 \quad \nu_3 = 60.09$
$r_6 = -1.8770$
$\quad d_6 = 0.3500 \quad n_4 = 1.84666 \quad \nu_4 = 23.88$
$r_7 = -9.8460$
$\quad d_7 = 0.9800$
$r_8 = -1.6480$
$\quad d_8 = 0.5300 \quad n_5 = 1.72825 \quad \nu_5 = 28.46$
$r_9 = \infty$
$\quad d_9 = 1.4100 \quad n_6 = 1.69680 \quad \nu_6 = 55.52$
$r_{10} = -2.2060$ $f = 1.27, \quad \dfrac{|f_1|}{f} = 0.71,$ $\dfrac{|R_c|}{f} = \dfrac{|r_6|}{f} = 1.46, \quad \dfrac{R_a}{R_b} = \dfrac{r_8}{r_{10}} = 0.74,$ $\dfrac{n_a - 1}{n_a} \dfrac{1}{R_a} + \dfrac{1 - n_b}{n_b} \dfrac{1}{R_b} =$ $\dfrac{n_5 - 1}{n_5} \dfrac{1}{r_8} + \dfrac{1 - n_6}{n_6} \dfrac{1}{r_{10}} = -0.070$

Embodiment 6

$r_1 = \infty$
$\quad d_1 = 0.2000 \quad n_1 = 1.75700 \quad \nu_1 = 47.87$
$r_2 = 0.9130$
$\quad d_2 = 0.3000$
$r_3 = \infty$
$\quad d_3 = 6.09 \quad n_2 = 1.80610 \quad \nu_2 = 40.95$
$r_4 = -2.7070$
$\quad d_4 = 0.5000$
$r_5 = 4.2870$
$\quad d_5 = 1.4300 \quad n_3 = 1.51633 \quad \nu_3 = 64.15$
$r_6 = -2.3730$
$\quad d_6 = 0.4000 \quad n_4 = 1.84666 \quad \nu_4 = 23.88$
$r_7 = -7.3700$
$\quad d_7 = 0.9200$
$r_8 = -2.0470$
$\quad d_8 = 0.8600 \quad n_5 = 1.69895 \quad \nu_5 = 30.12$
$r_9 = \infty$
$\quad d_9 = 1.1000 \quad n_6 = 1.75700 \quad \nu_6 = 47.87$
$r_{10} = -2.8310$ $f = 1.68, \quad \dfrac{|f_1|}{f} = 0.71,$ $\dfrac{|R_c|}{f} = \dfrac{|r_6|}{f} = 1.40, \quad \dfrac{R_a}{R_b} = \dfrac{r_8}{r_{10}} = 0.72,$ $\dfrac{n_a - 1}{n_a} \dfrac{1}{R_a} + \dfrac{1 - n_b}{n_b} \dfrac{1}{R_b} =$ -continued

| Embodiment 6 |
|---|
| $\frac{n_5-1}{n_5}\frac{1}{r_8}+\frac{1-n_6}{n_6}\frac{1}{r_{10}} = -0.049$ |

| Embodiment 7 | | | |
|---|---|---|---|
| $r_0 = \infty$ | $d_0 = 0.3000$ | $n_0 = 1.51633$ | $\nu_0 = 64.15$ |
| $r'_0 = \infty$ | $d'_0 = 0.2000$ | | |
| $r_1 = \infty$ | $d_1 = 0.2000$ | $n_1 = 1.78800$ | $\nu_1 = 47.43$ |
| $r_2 = 0.6800$ | $d_2 = 0.3000$ | | |
| $r_3 = \infty$ | $d_3 = 3.5000$ | $n_2 = 1.88300$ | $\nu_2 = 40.76$ |
| $r_4 = \infty$ | $d_4 = 1.5400$ | $n_3 = 1.78800$ | $\nu_3 = 47.43$ |
| $r_5 = -2.3820$ | $d_5 = 0.7600$ | | |
| $r_6 = 4.4630$ | $d_6 = 1.7900$ | $n_4 = 1.62041$ | $\nu_4 = 60.27$ |
| $r_7 = -1.7990$ | $d_7 = 0.4000$ | $n_5 = 1.84666$ | $\nu_5 = 23.88$ |
| $r_8 = -9.4030$ | $d_8 = 2.2600$ | | |
| $r_9 = -1.7880$ | $d_9 = 0.7500$ | $n_6 = 1.72342$ | $\nu_6 = 38.03$ |
| $r_{10} = \infty$ | $d_{10} = 2.2000$ | $n_7 = 1.78800$ | $\nu_7 = 47.43$ |
| $r_{11} = -2.8170$ | | | |

$f = 1.965, \frac{|f_1|}{f} = 0.49$ $\frac{|R_c|}{f} = \frac{|r_7|}{f} = 0.91, \frac{R_a}{R_b} = \frac{r_9}{r_{11}} = 0.63,$ $\frac{n_a-1}{n_a}\frac{1}{R_a}+\frac{1-n_b}{n_b}\frac{1}{R_b} =$ $\frac{n_6-1}{n_6}\frac{1}{r_9}+\frac{1-n_7}{n_7}\frac{1}{r_{11}} = -0.078$

| Embodiment 8 | | | |
|---|---|---|---|
| $r_1 = \infty$ | $d_1 = 0.2000$ | $n_1 = 1.78800$ | $\nu_1 = 47.43$ |
| $r_2 = 0.6323$ | $d_2 = 0.3000$ | | |
| $r_3 = \infty$ | $d_3 = 3.7153$ | $n_2 = 1.78800$ | $\nu_2 = 47.43$ |
| $r_4 = -2.2149$ | $d_4 = 0.6295$ | | |
| $r_5 = 6.3945$ | $d_5 = 2.0000$ | $n_3 = 1.64000$ | $\nu_3 = 60.09$ |
| $r_6 = -1.7561$ | $d_6 = 0.5000$ | $n_4 = 1.84666$ | $\nu_4 = 23.88$ |
| $r_7 = -3.6986$ | $d_7 = 2.0353$ | | |
| $r_8 = -1.5615$ | $d_8 = 0.5000$ | $n_5 = 1.72825$ | $\nu_5 = 28.46$ |
| $r_9 = \infty$ | $d_9 = 2.0000$ | $n_6 = 1.77250$ | $\nu_6 = 49.66$ |
| $r_{10} = -2.9074$ | | | |

$f = 1.90, \frac{|f_1|}{f} = 0.42,$ $\frac{|R_c|}{f} = \frac{|r_6|}{f} = 0.92, \frac{R_a}{R_b} = \frac{r_8}{r_{10}} = 0.53,$ $\frac{n_a-1}{n_a}\frac{1}{R_a}+\frac{1-n_b}{n_b}\frac{1}{R_b} =$ -continued

| Embodiment 8 |
|---|
| $\frac{n_5-1}{n_5}\frac{1}{r_8}+\frac{1-n_6}{n_6}\frac{1}{r_{10}} = -0.120$ |

| Embodiment 9 | | | |
|---|---|---|---|
| $r_1 = \infty$ | $d_1 = 0.2000$ | $n_1 = 1.78800$ | $\nu_1 = 47.43$ |
| $r_2 = 0.6720$ | $d_2 = 0.3000$ | | |
| $r_3 = \infty$ | $d_3 = 4.957$ | $n_2 = 1.78800$ | $\nu_2 = 47.43$ |
| $r_4 = -2.4390$ | $d_4 = 0.1000$ | | |
| $r_5 = 4.3110$ | $d_5 = 1.4100$ | $n_3 = 1.64000$ | $\nu_3 = 60.09$ |
| $r_6 = -1.8420$ | $d_6 = 1.0300$ | $n_4 = 1.84666$ | $\nu_4 = 23.88$ |
| $r_7 = -7.0940$ | $d_7 = 1.7400$ | | |
| $r_8 = -1.8770$ | $d_8 = 0.5900$ | $n_5 = 1.72825$ | $\nu_5 = 28.46$ |
| $r_9 = -6.9230$ | $d_9 = 1.0300$ | $n_6 = 1.77250$ | $\nu_6 = 49.66$ |
| $r_{10} = -2.4390$ | | | |

$f = 1.31, \frac{|f_1|}{f} = 0.64,$ $\frac{|R_c|}{f} = \frac{|r_6|}{f} = 1.39, \frac{R_a}{R_b} = \frac{r_8}{r_{10}} = 0.77$ $\frac{n_a-1}{n_a}\frac{1}{R_a}+\frac{1-n_b}{n_b}\frac{1}{R_b} =$ $\frac{n_5-1}{n_5}\frac{1}{r_8}+\frac{1-n_6}{n_6}\frac{1}{r_{10}} = -0.046$

| Embodiment 10 | | | |
|---|---|---|---|
| $r_1 = \infty$ | $d_1 = 0.2000$ | $n_1 = 1.75700$ | $\nu_1 = 47.87$ |
| $r_2 = 0.9050$ | $d_2 = 0.3000$ | | |
| $r_3 = \infty$ | $d_3 = 5.6400$ | $n_2 = 1.75700$ | $\nu_2 = 47.87$ |
| $r_4 = -2.6190$ | $d_4 = 0.3000$ | | |
| $r_5 = 4.2950$ | $d_5 = 2.0500$ | $n_3 = 1.51633$ | $\nu_3 = 64.15$ |
| $r_6 = -2.1660$ | $d_6 = 0.4000$ | $n_4 = 1.84666$ | $\nu_4 = 23.88$ |
| $r_7 = -7.9380$ | $d_7 = 2.1800$ | | |
| $r_8 = -1.9880$ | $d_8 = 0.4100$ | $n_5 = 1.67270$ | $\nu_5 = 32.10$ |
| $r_9 = 5.8970$ | $d_9 = 1.1000$ | $n_6 = 1.80610$ | $\nu_6 = 40.95$ |
| $r_{10} = -2.7420$ | | | |

$f = 1.81, \frac{|f_1|}{f} = 0.65$ $\frac{|R_c|}{f} = \frac{|r_6|}{f} = 1.19, \frac{R_a}{R_b} = \frac{r_8}{r_{10}} = 0.72, \frac{n_a-1}{n_a}\frac{1}{R_a}+$ $\frac{1-n_b}{n_b}\frac{1}{R_b} = \frac{n_5-1}{n_5}\frac{1}{r_8}+\frac{1-n_6}{n_6}\frac{1}{r_{10}} = -0.040$

| Embodiment 11 | | | |
|---|---|---|---|
| $r_1 = \infty$ | $d_1 = 0.2000$ | $n_1 = 1.78800$ | $\nu_1 = 47.43$ |
| $r_2 = 0.6133$ | $d_2 = 2.23$ | | |
| $r_3 = -68.5068$ | $d_3 = 1.8626$ | $n_2 = 1.78800$ | $\nu_2 = 47.43$ |
| $r_4 = -2.3154$ | $d_4 = 0.3406$ | | |
| $r_5 = 3.6741$ | $d_5 = 1.7700$ | $n_3 = 1.63854$ | $\nu_3 = 55.38$ |
| $r_6 = -1.4541$ | $d_6 = 0.7000$ | $n_4 = 1.84666$ | $\nu_4 = 23.88$ |
| $r_7 = -13.0093$ | $d_7 = 1.4797$ | | |
| $r_8 = -1.7763$ | $d_8 = 0.7000$ | $n_5 = 1.72825$ | $\nu_5 = 28.46$ |
| $r_9 = \infty$ | $d_9 = 1.3900$ | $n_6 = 1.77250$ | $\nu_6 = 49.66$ |
| $r_{10} = -2.4237$ | | | |

$f = 1.31, \dfrac{|f_1|}{f} = 0.59,$ $\dfrac{|R_c|}{f} = \dfrac{|r_6|}{f} = 1.10, \dfrac{R_a}{R_b} = \dfrac{r_8}{r_{10}} = 0.73, \dfrac{n_a - 1}{n_a}\dfrac{1}{R_a} + \dfrac{1 - n_b}{n_b}\dfrac{1}{R_b} = \dfrac{n_5 - 1}{n_5}\dfrac{1}{r_8} + \dfrac{1 - n_6}{n_6}\dfrac{1}{r_{10}} = -0.057$

| Embodiment 12 | | | |
|---|---|---|---|
| $r_1 = \infty$ | $d_1 = 0.2000$ | $n_1 = 1.78800$ | $\nu_1 = 47.43$ |
| $r_2 = 0.6899$ | $d_2 = 0.3000$ | | |
| $r_3 = 13.6272$ | $d_3 = 4.928$ | $n_2 = 1.78800$ | $\nu_2 = 47.43$ |
| $r_4 = -2.2510$ | $d_4 = 0.1000$ | | |
| $r_5 = -164.3754$ | $d_5 = 1.0752$ | $n_3 = 1.51633$ | $\nu_3 = 64.15$ |
| $r_6 = -30.3152$ | $d_6 = 0.1000$ | | |
| $r_7 = 3.0359$ | $d_7 = 1.7700$ | $n_4 = 1.63854$ | $\nu_4 = 55.38$ |
| $r_8 = -1.3278$ | $d_8 = 0.7000$ | $n_5 = 1.84666$ | $\nu_5 = 23.88$ |
| $r_9 = -10.2303$ | $d_9 = 0.5811$ | | |
| $r_{10} = -1.9987$ | $d_{10} = 0.7000$ | $n_6 = 1.72825$ | $\nu_6 = 28.46$ |
| $r_{11} = \infty$ | $d_{11} = 1.3900$ | $n_7 = 1.77250$ | $\nu_7 = 49.66$ |
| $r_{12} = -2.4285$ | | | |

$f = 1.32, \dfrac{|f_1|}{f} = 0.66,$ $\dfrac{|R_c|}{f} = \dfrac{|r_8|}{f} = 1.00, \dfrac{R_a}{R_b} = \dfrac{r_{10}}{r_{12}} = 0.82, \dfrac{n_a - 1}{n_a}\dfrac{1}{R_a} + \dfrac{1 - n_b}{n_b}\dfrac{1}{R_b} = \dfrac{n_6 - 1}{n_6}\dfrac{1}{r_{10}} + \dfrac{1 - n_7}{n_7}\dfrac{1}{r_{12}} = -0.031$

| Embodiment 13 | | | |
|---|---|---|---|
| $r_1 = \infty$ | $d_1 = 0.2000$ | $n_1 = 1.78800$ | $\nu_1 = 47.43$ |
| $r_2 = 0.6240$ | $d_2 = 2.0663$ | | |
| $r_3 = 80.4600$ | $d_3 = 1.5954$ | $n_2 = 1.78800$ | $\nu_2 = 47.43$ |
| $r_4 = -2.3135$ | $d_4 = 0.1205$ | | |
| $r_5 = -112.1086$ | $d_5 = 1.4733$ | $n_3 = 1.51633$ | $\nu_3 = 64.15$ |
| $r_6 = -30.1167$ | $d_6 = 0.0929$ | | |
| $r_7 = 3.1354$ | $d_7 = 1.7700$ | $n_4 = 1.63854$ | $\nu_4 = 55.38$ |
| $r_8 = -1.2528$ | $d_8 = 0.7000$ | $n_5 = 1.84666$ | $\nu_5 = 23.88$ |
| $r_9 = -9.2528$ | $d_9 = 1.0722$ | | |
| $r_{10} = -1.9547$ | $d_{10} = 0.7000$ | $n_6 = 1.72825$ | $\nu_6 = 28.46$ |
| $r_{11} = \infty$ | $d_{11} = 1.3900$ | $n_7 = 1.77250$ | $\nu_7 = 49.66$ |
| $r_{12} = -2.4215$ | | | |

$f = 1.31, \dfrac{|f_1|}{f} = 0.59,$ $\dfrac{|R_c|}{f} = \dfrac{|r_8|}{f} = 0.93, \dfrac{R_a}{R_b} = \dfrac{r_{10}}{r_{22}} = 0.80, \dfrac{n_a - 1}{n_a}\dfrac{1}{R_a} + \dfrac{1 - n_b}{n_b}\dfrac{1}{R_b} = \dfrac{n_6 - 1}{n_6}\dfrac{1}{r_{10}} + \dfrac{1 - n_7}{n_7}\dfrac{1}{r_{12}} = -0.036$

| Embodiment 14 | | | |
|---|---|---|---|
| $r_0 = \infty$ | $d_0 = 0.3000$ | $n_0 = 1.51633$ | $\nu_0 = 64.15$ |
| $r'_0 = \infty$ | $d'_0 = 0.2000$ | | |
| $r_1 = \infty$ | $d_1 = 0.2000$ | $n_1 = 1.80610$ | $\nu_1 = 40.95$ |
| $r_2 = 0.7605$ | $d_2 = 0.3000$ | | |
| $r_3 = \infty$ | $d_3 = 7.6000$ | $n_2 = 1.78800$ | $\nu_2 = 47.43$ |
| $r_4 = -3.3709$ | $d_4 = 0.1000$ | | |
| $r_5 = 3.2819$ | $d_5 = 1.3089$ | $n_3 = 1.60311$ | $\nu_3 = 60.70$ |
| $r_6 = -3.2819$ | $d_6 = 1.8392$ | $n_4 = 1.78472$ | $\nu_4 = 25.71$ |
| $r_7 = \infty$ | $d_7 = 1.5075$ | | |
| $r_8 = -2.0629$ | $d_8 = 1.3313$ | $n_5 = 1.78472$ | $\nu_5 = 25.71$ |
| $r_9 = \infty$ | $d_9 = 1.2847$ | $n_6 = 1.78800$ | $\nu_6 = 47.43$ |
| $r_{10} = -3.3628$ | | | |

$f = 1.432, \dfrac{|f_1|}{f} = 0.658,$ $\dfrac{|R_c|}{f} = \dfrac{|r_6|}{f} = 2.291, \dfrac{R_a}{R_b} = \dfrac{r_8}{r_{10}} = 0.6134,$ $\dfrac{n_a - 1}{n_a}\dfrac{1}{R_a} + \dfrac{1 - n_b}{n_b}\dfrac{1}{R_b} = \dfrac{n_5 - 1}{n_5}\dfrac{1}{r_8} + \dfrac{1 - n_6}{n_6}\dfrac{1}{r_{10}} = -0.082$

| Embodiment 15 | | | |
|---|---|---|---|
| $r_0 = \infty$ | $d_0 = 0.3000$ | $n_0 = 1.51633$ | $\nu_0 = 64.15$ |
| $r'_0 = \infty$ | $d'_0 = 0.2000$ | | |
| $r_1 = \infty$ | $d_1 = 0.2000$ | $n_1 = 1.80610$ | $\nu_1 = 40.95$ |
| $r_2 = 0.7250$ | $d_2 = 0.3000$ | | |
| $r_3 = \infty$ | | | |

-continued

Embodiment 15

| | | | |
|---|---|---|---|
| | $d_3 = 7.6000$ | $n_2 = 1.78800$ | $v_2 = 47.43$ |
| $r_4 = -3.2030$ | | | |
| | $d_4 = 0.1000$ | | |
| $r_5 = 2.7600$ | | | |
| | $d_5 = 1.7800$ | $n_3 = 1.62041$ | $v_3 = 60.27$ |
| $r_6 = -3.1440$ | | | |
| | $d_6 = 0.7000$ | $n_4 = 1.84666$ | $v_4 = 23.88$ |
| $r_7 = 14.1130$ | | | |
| | $d_7 = 1.3100$ | | |
| $r_8 = -1.8150$ | | | |
| | $d_8 = 1.5400$ | $n_5 = 1.76182$ | $v_5 = 26.55$ |
| $r_9 = \infty$ | | | |
| | $d_9 = 1.3900$ | $n_6 = 1.78800$ | $v_6 = 47.43$ |
| $r_{10} = -3.2700$ | | | |

$$f = 1.404, \frac{|f_1|}{f} = 0.640$$

$$\frac{|R_c|}{f} = \frac{|r_6|}{f} = 2.239, \frac{R_a}{R_b} = \frac{r_8}{r_{10}} = 0.555$$

$$\frac{n_a - 1}{n_a} \cdot \frac{1}{R_a} + \frac{1 - n_b}{n_b} \cdot \frac{1}{R_b} = \frac{n_5 - 1}{n_5} \cdot \frac{1}{r_8} + \frac{1 - n_6}{n_6} \cdot \frac{1}{r_{10}} = -0.103$$

In embodiments shown in the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $v_1, v_2, \ldots$ respectively represent Abbe's numbers of respective lenses.

Figure 3:
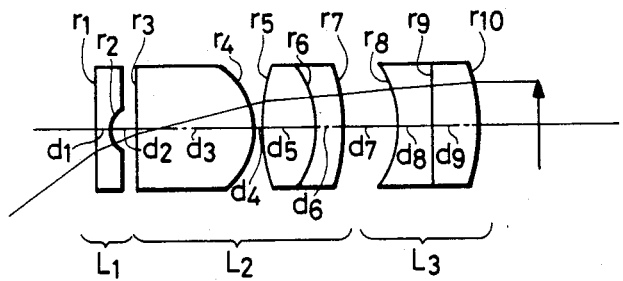
FIG. 3 shows a sectional view of Embodiments 1 through 6 and Embodiment 8 of the objective according to the present invention.
Figure 4:
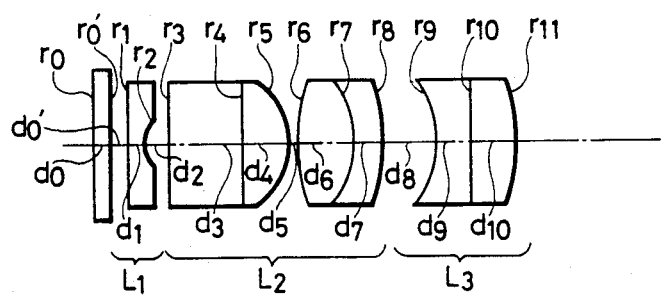
FIG. 4 shows a sectional view of Embodiment 7 of the objective according to the present invention.

Out of respective embodiments shown in the above, Embodiments 1 through 6 and Embodiment 8 have lens configuration as shown in FIG. 3. Embodiment 7 has lens configuration as shown in FIG. 4 and is arranged that a cover glass is provided in front of the negative lens group $L_1$, and the lens component on the object side in the positive lens group $L_2$ is arranged as a lens component consisting of a glass block and plano-convex lens which are centered together. Therefore, in the numerical data of Embodiment 7, reference symbols $r_0$, $r'_0$, $d_0$, $d'_0$, $n_0$ and $v_0$ respectively represent the data of the cover glass. Besides, reference symbol $r_4$ represents the radius of curvature of the cemented surface of said cemented lens component (cemented lens component consisting of the glass block and plano-convex lens). Besides, reference symbol $r_7$ corresponds to $R_c$, and $r_4$ is not included in $R_c$.

Figure 5:
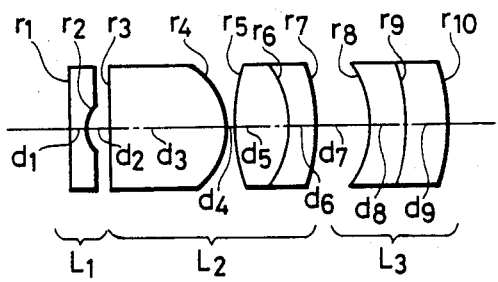
FIG. 5 shows a sectional view of Embodiment 9 of the objective according to the present invention.

Embodiment 9 has lens configuration as shown in FIG. 5. In Embodiment 9, the cemented surface in the lens unit $L_3$, which is a meniscus lens, is not arranged as a planar surface but arranged as a spherical surface which is concave toward the object side.

Figure 6:
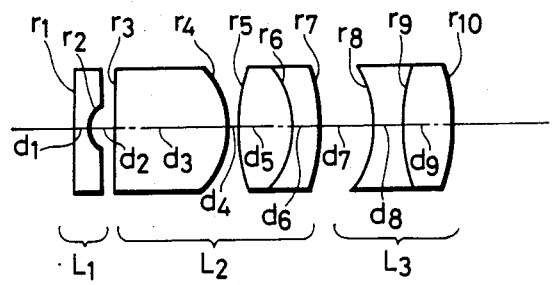
FIG. 6 shows a sectional view of Embodiment 10 of the objective according to the present invention.

Embodiment 10 has lens configuration as shown in FIG. 6. In Embodiment 10, the cemented surface in the lens unit $L_3$, which is a meniscus lens, is arranged as a spherical surface which is convex toward the object side.

Figure 7:
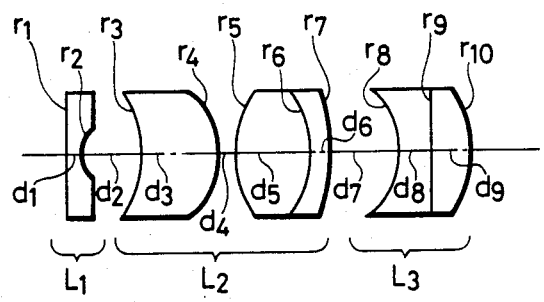
FIG. 7 shows a sectional view of Embodiment 11 of the objective according to the present invention.
Figure 8:
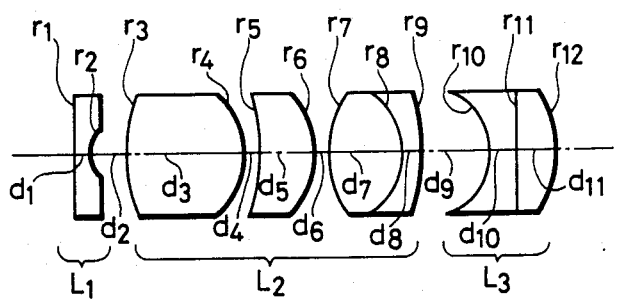
FIG. 8 shows a sectional view of Embodiments 12 and 13 of the objective according to the present invention.

Embodiment 11 has lens configuration as shown in FIG. 7, and Embodiments 12 and 13 respectively have lens configuration as shown in FIG. 8.

Figure 9:
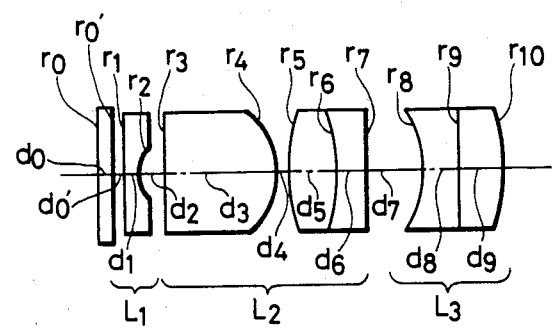
FIG. 9 shows a sectional view of Embodiment 14 of the objective according to the present invention.
Figure 10:
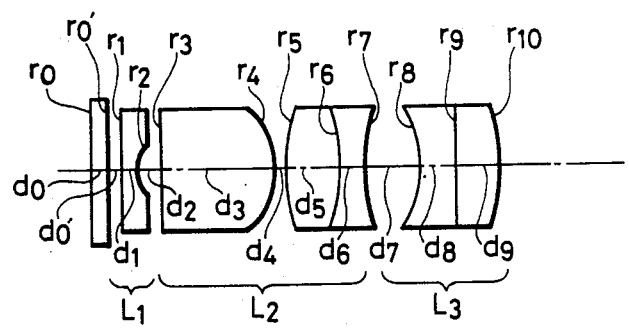
FIG. 10 shows a sectional view of Embodiment 15 of the objective accordiang to the present invention.
Figure 11:
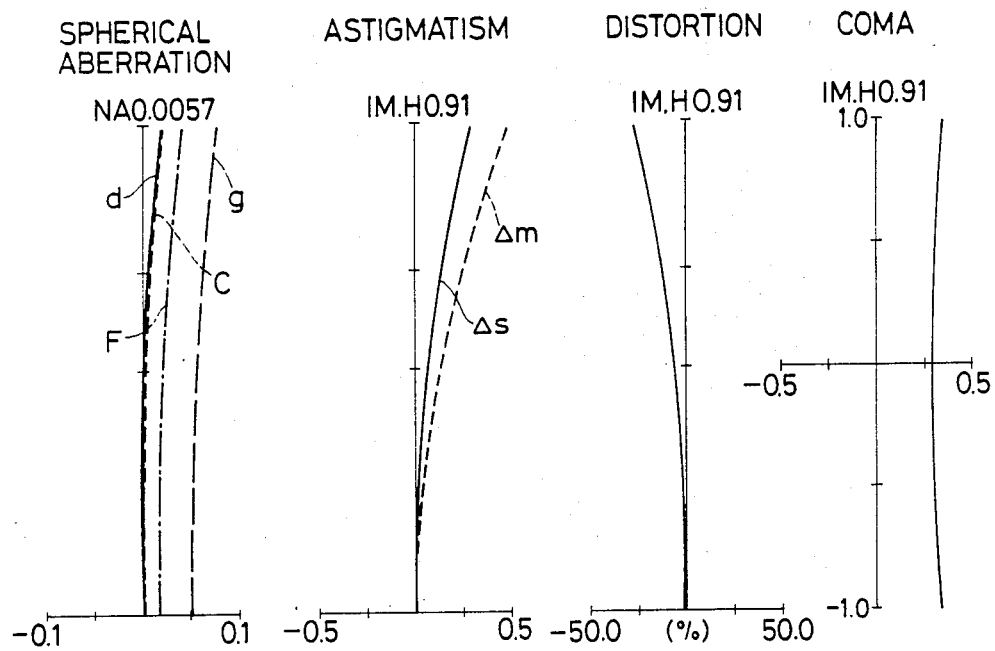
Figure 12:
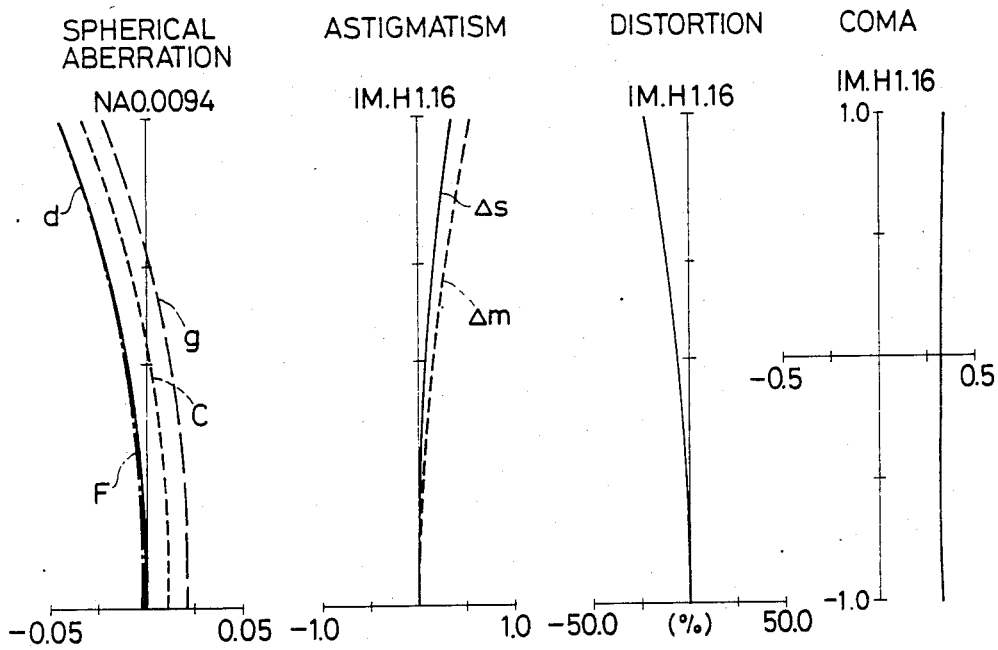
Figure 13:
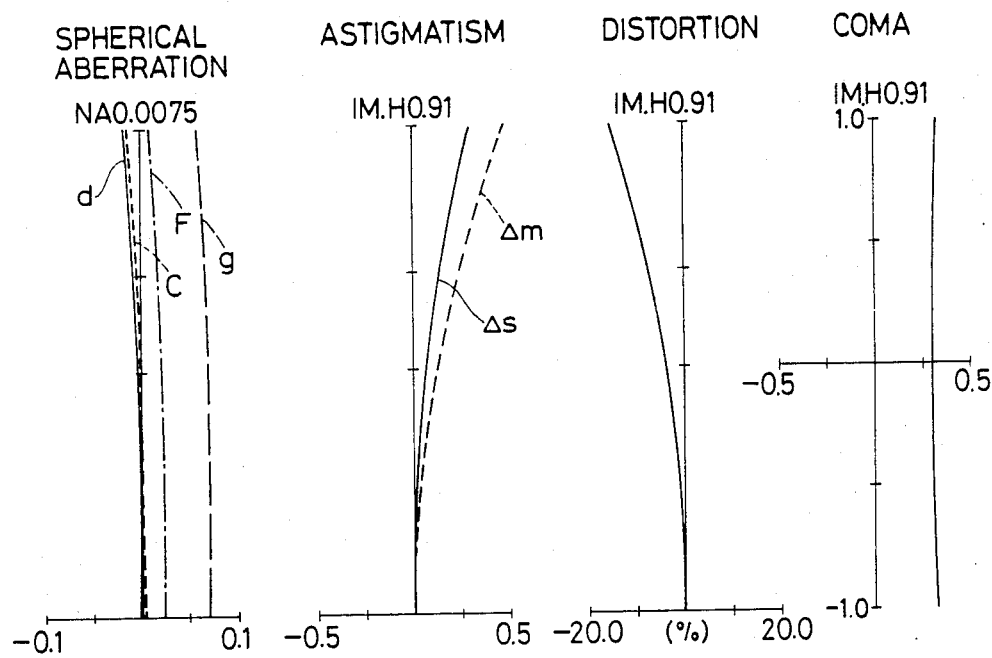
Figure 14:
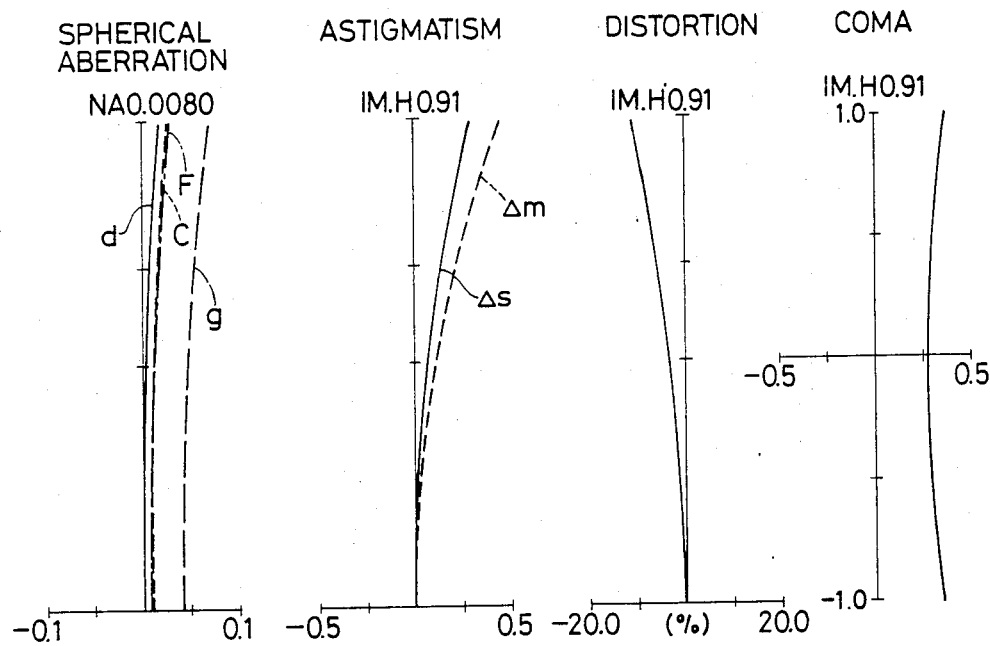
Figure 17:
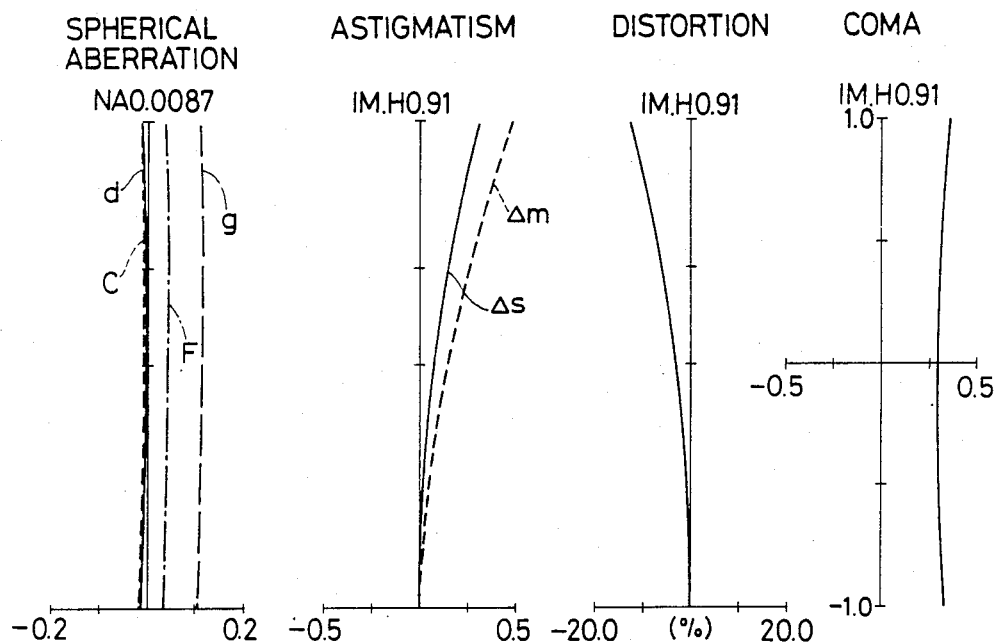
Figure 18:
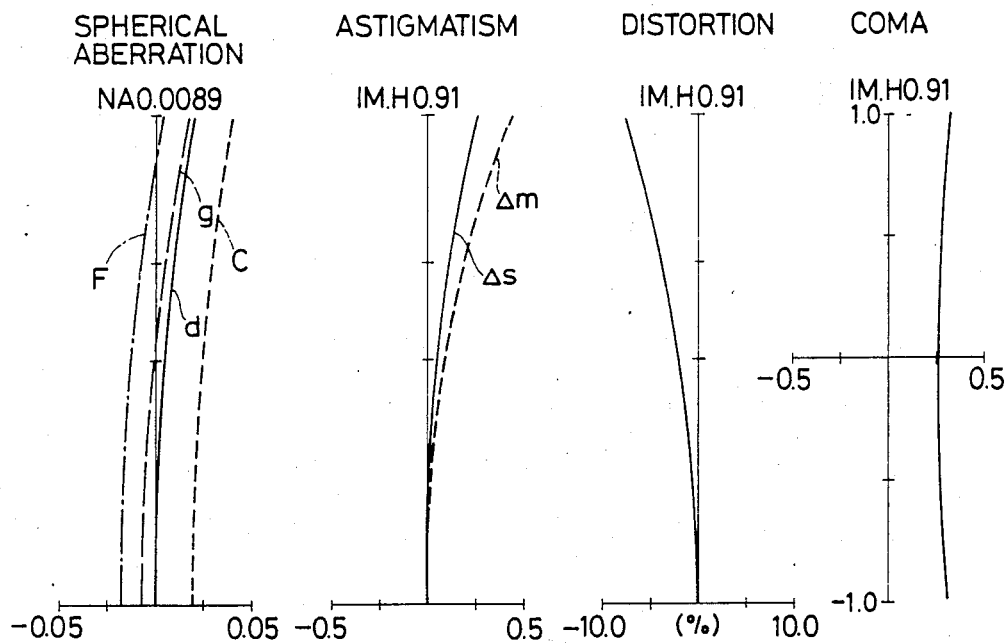
Figure 19:
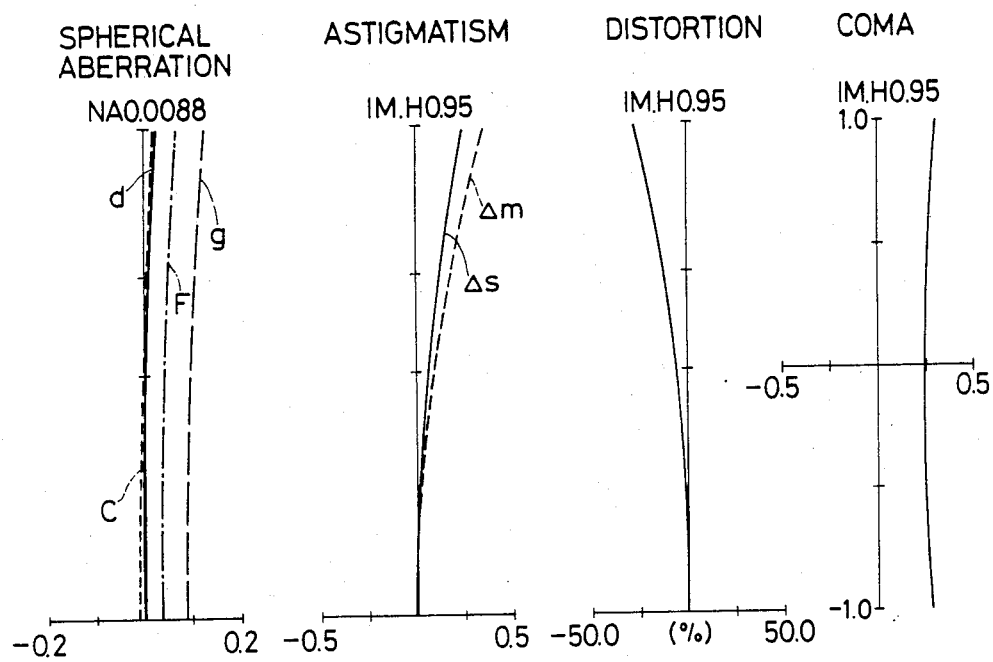
Figure 20:
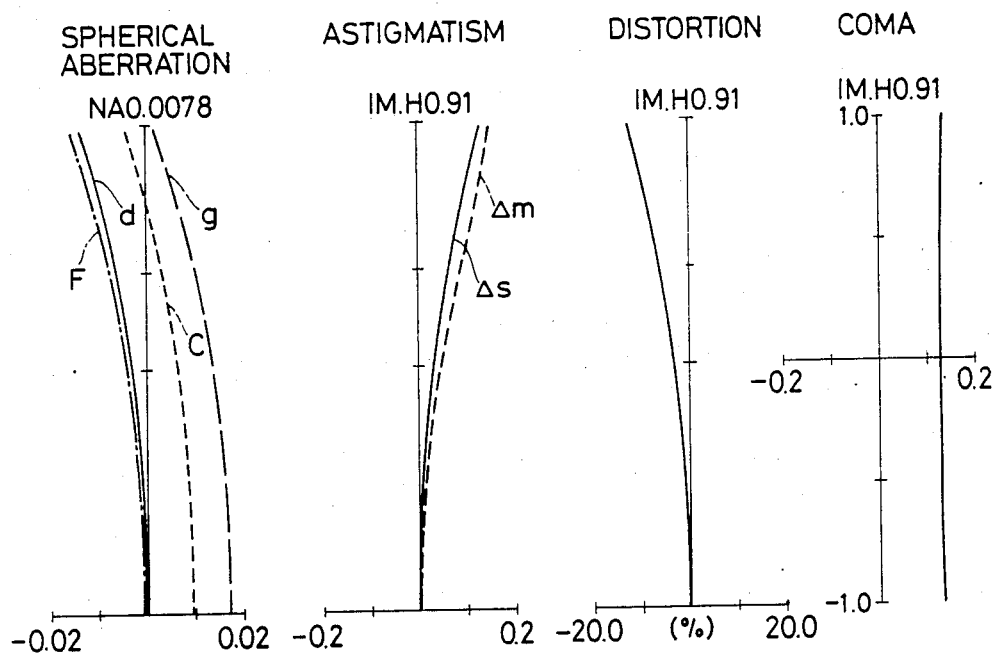
Figure 21:
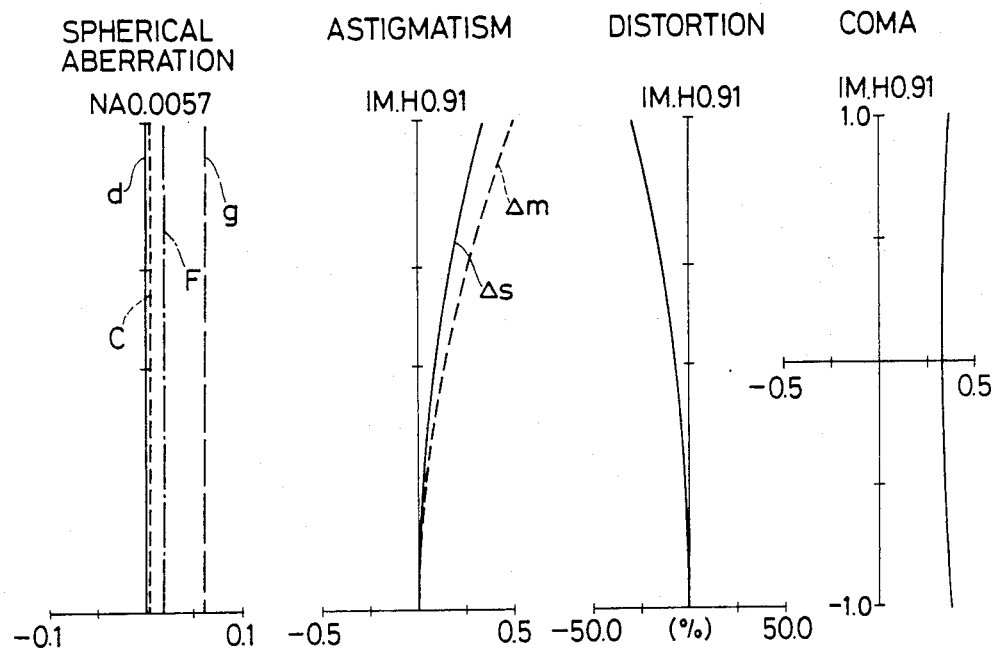
Figure 22:
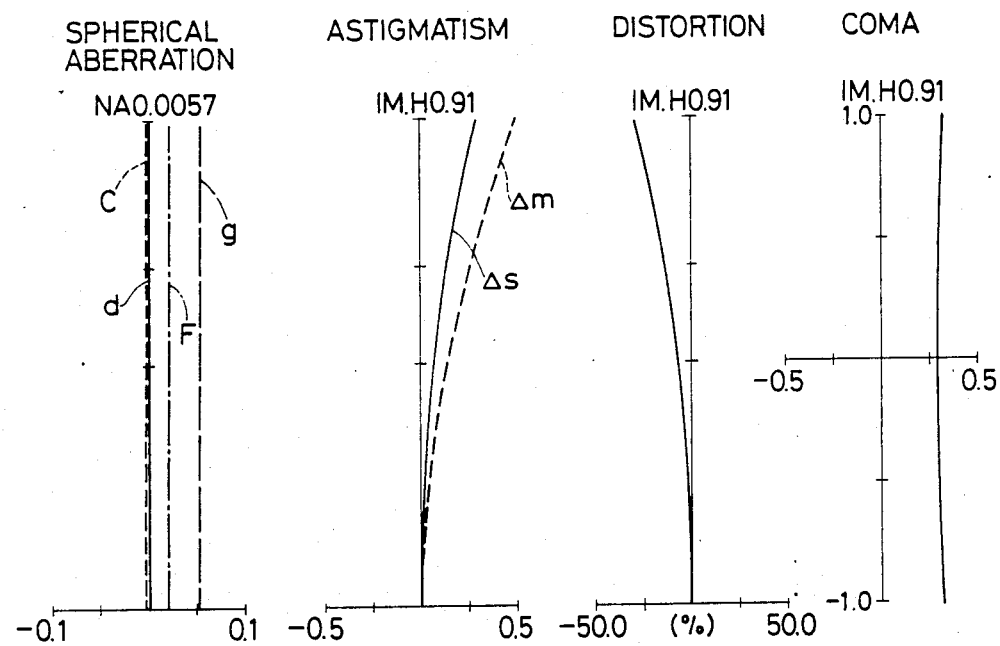
Figure 23:
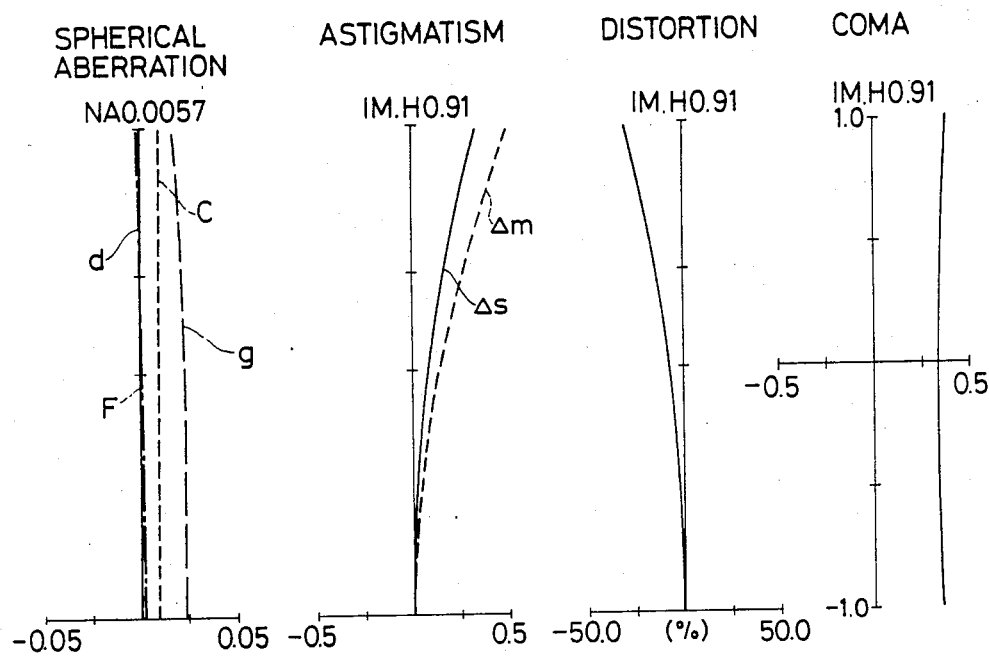
Figure 24:
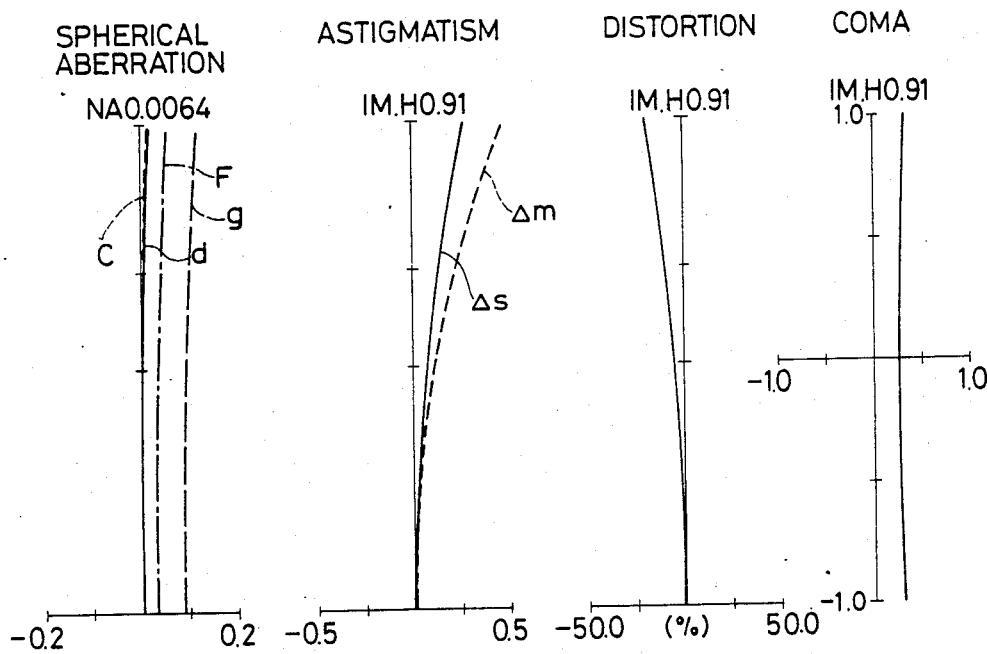
Figure 25:
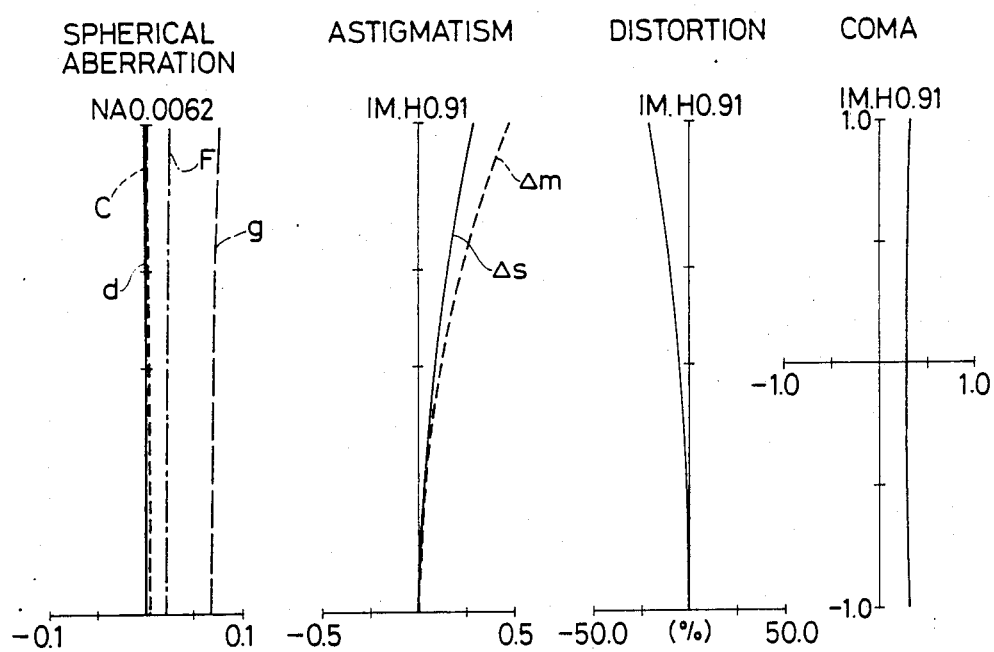

Embodiments 14 and 15 respectively have lens configurations as shown in FIGS. 9 and 10 and are respectively arranged that a cover glass is provided in front of the negative lens unit $L_1$.

The objective according to the present invention is arranged that the dispersion in the field angle is made small by providing the meniscus lens which is concave toward the object side and, moreover, it is thereby arranged that curvature of field of the endoscope as a whole including the objective is corrected favourably when said objective is used in an endoscope which employs relay lenses. Especially, by composing the lens system so as to fulfill the condition (1), it is possible to correct the above-mentioned curvature of field favourably.

Besides, by arranging the shape of the meniscus lens so as to fulfill the condition (2), it is possible to correct the above-mentioned curvature of field more favourably.

Furthermore, when the objective is arranged so as to fulfill the conditions (3) and (4), it is possible to obtain an objective of which coma is corrected favourably.

I claim:

1. An objective for an endoscope to be used in an endoscope employing relay lenses, said objective for an endoscope comprising, in the order from the object side, a negative lens unit, a positive lens unit, and a lens unit comprising a cemented meniscus lens arranged to be concave toward the object side.

2. An objective for an endoscope according to claim 1 wherein said meniscus lens is arranged as a single lens and said objective is arranged to fulfill the following condition:

$$\frac{n_a - 1}{n_a} \cdot \frac{1}{R_a} + \frac{1 - n_a}{n_a} \cdot \frac{1}{R_b} < 0$$

where, reference symbol $n_a$ represents the refractive index of said meniscus lens, and reference symbols $R_a$ and $R_b$ respectively represent radii of curvature of the surface on the object side and surface on the image side of said cemented meniscus lens.

3. An objective for an endoscope according to claim 1 wherein said cemented meniscus lens is arranged as a cemented doublet and said objective lens arranged to fulfill the condition (1) shown below:

$$\frac{n_a - 1}{n_a} \cdot \frac{1}{R_a} + \frac{1 - n_b}{n_b} \cdot \frac{1}{R_b} < 0 \quad (1)$$

where, reference symbols $n_a$ and $n_b$ respectively represent refractive indices of the lens elements arranged on the object side and image side in said meniscus lens, and reference symbols $R_a$ and $R_b$ respectively represent radii of curvature of the surface on the object side and surface on the image side of said cemented meniscus lens.

4. An objective for an endoscope according to claim 3 further fulfilling the condition (2) shown below:

$$0.45 < \frac{R_a}{R_b} < 0.9. \quad (2)$$

5. An objective for an endoscope according to claim 4 wherein said positive lens unit comprises a cemented doublet arranged to be convex toward the object side and said objective is arranged to fulfill the conditions (3) and (4) shown below:

$$0.4 < \frac{|f_1|}{f} < 0.75 \quad (3)$$

$$0.75 < \frac{|R_c|}{f} < 2.6 \quad (4)$$

where, reference symbol $R_c$ represents the radius of curvature of the cemented surface of the cemented doublet in said positive lens unit, reference symbol $f_1$ represents the focal length of said negative lens unit, and reference symbol $f$ represents the focal length of said objective as a whole.

6. An objective for an endoscope according to claim 5 wherein said negative lens unit comprises a plano-concave lens, and said positive lens unit comprises two positive cemented doublets.

7. An objective for an endoscope according to claim 6 wherein said objective has the following numerical data:

| | | | |
|---|---|---|---|
| $r_0 = \infty$ | | | |
| | $d_0 = 0.3000$ | $n_0 = 1.51633$ | $\nu_0 = 64.15$ |
| $r'_0 = \infty$ | | | |
| | $d'_0 = 0.2000$ | | |
| $r_1 = \infty$ | | | |
| | $d_1 = 0.2000$ | $n_1 = 1.78800$ | $\nu_1 = 47.43$ |
| $r_2 = 0.6800$ | | | |
| | $d_2 = 0.3000$ | | |
| $r_3 = \infty$ | | | |
| | $d_3 = 3.5000$ | $n_2 = 1.88300$ | $\nu_2 = 40.76$ |
| $r_4 = \infty$ | | | |
| | $d_4 = 0.5400$ | $n_3 = 1.78800$ | $\nu_3 = 47.43$ |
| $r_5 = -2.3820$ | | | |
| | $d_5 = 1.7600$ | | |
| $r_6 = 4.4630$ | | | |
| | $d_6 = 1.7900$ | $n_4 = 1.62041$ | $\nu_4 = 60.27$ |
| $r_7 = -1.7990$ | | | |
| | $d_7 = 0.4000$ | $n_5 = 1.84666$ | $\nu_5 = 23.88$ |
| $r_8 = -9.4030$ | | | |
| | $d_8 = 2.2600$ | | |
| $r_9 = -1.7880$ | | | |
| | $d_9 = 0.7500$ | $n_6 = 1.72342$ | $\nu_6 = 38.03$ |
| $r_{10} = \infty$ | | | |
| | $d_{10} = 2.2000$ | $n_7 = 1.78800$ | $\nu_7 = 47.43$ |
| $r_{11} = -2.8170$ | | | |

$$f = 1.965, \frac{|f_1|}{f} = 0.49$$

$$\frac{|R_c|}{f} = \frac{|r_7|}{f} = 0.91, \frac{R_a}{R_b} = \frac{r_9}{r_{11}} = 0.63$$

$$\frac{n_a - 1}{n_a} \frac{1}{R_a} + \frac{1 - n_b}{n_b} \frac{1}{R_b} + \frac{n_6 - 1}{n_6} \frac{1}{r_9}$$

$$+ \frac{1 - n_7}{n_7} \frac{1}{r_{11}} = -0.078$$

where, reference symbols $r_1$ and $r_{11}$ respectively represent radii of curvature of respective lens surfaces, reference symbols $d_1$ through $d_{10}$ respectively represent thicknesses of respective lenses and airspaces between respective lenses, reference symbols $n_1$ through $n_7$ respectively represent refractive indices of respective lenses, and reference symbols $\nu_1$ through $\nu_7$ respectively represent Abbe's numbers of respective lenses.

8. An objective for an endoscope according to claim 5 wherein said negative lens unit comprises a plano-concave lens, and said positive lens unit comprises a single meniscus lens and a positive cemented doublet.

9. An objective for an endoscope according to claim 8 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.6133$ | | | |
| | $d_2 = 2.23$ | | |
| $r_3 = -68.5068$ | | | |
| | $d_3 = 1.8626$ | $n_2 = 1.78800$ | $\nu_2 = 47.43$ |
| $r_4 = -2.3154$ | | | |
| | $d_4 = 0.3406$ | | |
| $r_5 = 3.6741$ | | | |
| | $d_5 = 1.7700$ | $n_3 = 1.63854$ | $\nu_3 = 55.38$ |
| $r_6 = -1.4541$ | | | |
| | $d_6 = 0.7000$ | $n_4 = 1.84666$ | $\nu_4 = 23.88$ |
| $r_7 = -13.0093$ | | | |
| | $d_7 = 1.4797$ | | |
| $r_8 = -1.7763$ | | | |
| | $d_8 = 1.7000$ | $n_5 = 1.72825$ | $\nu_5 = 28.46$ |
| $r_9 = \infty$ | | | |
| | $d_9 = 1.3900$ | $n_6 = 1.77250$ | $\nu_6 = 49.66$ |
| $r_{10} = -2.4237$ | | | |

$$f = 1.31, \frac{|f_1|}{f} = 0.59,$$

$$\frac{|R_c|}{f} = \frac{|r_6|}{f} = 1.10, \frac{R_a}{R_b} = \frac{r_8}{r_{10}} = 0.73,$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.057$$

where, reference symbols $r_1$ throuth $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

10. An objective for an endoscope according to claim 5 wherein said negative lens unit comprises a plano-concave lens, and said positive lens unit comprises a positive lens, a single meniscus lens and a positive cemented doublet.

11. An objective for an endoscope according to claim 10 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.6899$ | | | |
| | $d_2 = 0.3000$ | | |
| $r_3 = 13.6272$ | | | |
| | $d_3 = 4.928$ | $n_2 = 1.78800$ | $\nu_2 = 47.43$ |
| $r_4 = -2.2510$ | | | |
| | $d_4 = 0.1000$ | | |
| $r_5 = -164.3754$ | | | |
| | $d_5 = 1.0752$ | $n_3 = 1.51633$ | $\nu_3 = 64.15$ |
| $r_6 = -30.3152$ | | | |
| | $d_6 = 0.1000$ | | |
| $r_7 = 3.3059$ | | | |
| | $d_7 = 1.7700$ | $n_4 = 1.63854$ | $\nu_4 = 55.38$ |
| $r_8 = -1.3278$ | | | |
| | $d_8 = 0.7000$ | $n_5 = 1.84666$ | $\nu_5 = 23.88$ |
| $r_9 = -10.2303$ | | | |
| | $d_9 = 1.5811$ | | |
| $r_{10} = -1.9987$ | | | |
| | $d_{10} = 0.7000$ | $n_6 = 1.72825$ | $\nu_6 = 28.46$ |
| $r_{11} = \infty$ | | | |
| | $d_{11} = 1.3900$ | $n_7 = 1.77250$ | $\nu_7 = 49.66$ |
| $r_{12} = -2.4285$ | | | |

$$f = 1.32, \frac{|f_1|}{f} = 0.66,$$

$$\frac{|R_c|}{f} = \frac{|r_8|}{f} = 1.00, \frac{R_a}{R_b} = \frac{r_{10}}{r_{12}} = 0.82,$$

$$\frac{n_a - 1}{n_a} \frac{1}{R_a} + \frac{1 - n_b}{n_b} \frac{1}{R_b} = \frac{n_6 - 1}{n_6} \frac{1}{r_{10}} +$$

$$\frac{1 - n_7}{n_7} \frac{1}{r_{12}} = -0.031$$

where, reference symbols $r_1$ through $r_{12}$ respectively represent radii of curvature of respective lens surfaces, reference symbols $d_1$ through $d_{11}$ respectively represent thicknesses of respective lenses and airspaces between respective lenses, reference symbols $n_1$ through $n_7$ respectively represent refractive indices of respective lenses, and reference symbols $\nu_1$ through $\nu_7$ respectively represent Abbe's numbers of respective lenses.

12. An objective for an endoscope according to claim 10 wherein said objective has the following numerical data:

| | | | |
|---|---|---|---|
| $r_1 = \infty$ | $d_1 = 0.2000$ | $n_1 = 1.78800$ | $\nu_1 = 47.43$ |
| $r_2 = 0.6240$ | $d_2 = 2.0663$ | | |
| $r_3 = 80.4600$ | $d_3 = 1.5954$ | $n_2 = 1.78800$ | $\nu_2 = 47.43$ |
| $r_4 = -2.3135$ | $d_4 = 0.1205$ | | |
| $r_5 = -112.1086$ | $d_5 = 1.4733$ | $n_3 = 1.51633$ | $\nu_3 = 64.15$ |
| $r_6 = -30.1167$ | $d_6 = 0.0929$ | | |
| $r_7 = 3.1354$ | $d_7 = 1.7700$ | $n_4 = 1.63854$ | $\nu_4 = 55.38$ |
| $r_8 = -1.2528$ | $d_8 = 0.7000$ | $n_5 = 1.84666$ | $\nu_5 = 23.88$ |
| $r_9 = -9.2528$ | $d_9 = 1.0722$ | | |
| $r_{10} = -1.9547$ | $d_{10} = 0.7000$ | $n_6 = 1.72825$ | $\nu_6 = 28.46$ |
| $r_{11} = \infty$ | $d_{11} = 1.3900$ | $n_7 = 1.77250$ | $\nu_7 = 49.66$ |
| $r_{12} = -2.4215$ | | | |

$$f = 1.31, \frac{|f_1|}{f} = 0.59,$$

$$\frac{|R_c|}{f} = \frac{|r_8|}{f} = 0.93, \frac{R_a}{R_b} = \frac{r_{10}}{r_{12}} = 0.80,$$

$$\frac{n_a - 1}{n_a} \frac{1}{R_a} + \frac{1 - n_b}{n_b} \frac{1}{R_b} = \frac{n_6 - 1}{n_6} \frac{1}{r_{10}} +$$

$$\frac{1 - n_7}{n_7} \frac{1}{r_{12}} = -0.036$$

where, reference symbols $r_1$ through $r_{12}$ respeftively represent radii of curvature of respective lens surfaces, reference symbols $d_1$ through $d_{11}$ respectively represent thicknesses of respective lenses and airspaces between respective lenses, reference symbols $n_1$ through $n_7$ respectively represent refractive indices of respective lenses, and reference symbols $\nu_1$ through $\nu_7$ respectively represent Abbe's numbers of respective lenses.

13. An objective for an endoscope according to claim 5 wherein said negative lens unit comprises a plano-concave lens, and said said positive lens unit comprises a plano-convex lens and a positive cemented doublet.

14. An objective for an endoscope according to claim 13 wherein said objective has the following numerical data:

| | | | |
|---|---|---|---|
| $r_1 = \infty$ | $d_1 = 0.2000$ | $n_1 = 1.78800$ | $\nu_1 = 47.43$ |
| $r_2 = 0.6540$ | $d_2 = 0.3000$ | | |
| $r_3 = \infty$ | $d_3 = 5.16$ | $n_2 = 1.78800$ | $\nu_2 = 47.43$ |
| $r_4 = -2.4390$ | $d_4 = 0.1000$ | | |
| $r_5 = 3.6000$ | $d_5 = 1.7700$ | $n_3 = 1.63854$ | $\nu_3 = 55.38$ |
| $r_6 = -1.7490$ | $d_6 = -0.7000$ | $n_4 = 1.84666$ | $\nu_4 = 23.88$ |
| $r_7 = -9.0340$ | $d_7 = 1.2000$ | | |
| $r_8 = -1.8270$ | $d_8 = 0.7000$ | $n_5 = 1.72825$ | $\nu_5 = 28.46$ |
| $r_9 = \infty$ | $d_9 = 1.3900$ | $n_6 = 1.77250$ | $\nu_6 = 49.66$ |
| $r_{10} = -2.5920$ | | | |

$$f = 1.27, \frac{|f_1|}{f} = 0.65,$$

$$\frac{|R_c|}{f} = \frac{|r_6|}{f} = 1.37, \frac{R_a}{R_b} = \frac{r_8}{r_{10}} = 0.70$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.062$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

15. An objective for an endoscope according to claim 13 wherein said objective has the follwoing numerical data:

| | | | |
|---|---|---|---|
| $r_1 = \infty$ | $d_1 = 0.2000$ | $n_1 = 1.78800$ | $\nu_1 = 47.43$ |
| $r_2 = 0.9070$ | $d_2 = 0.3000$ | | |
| $r_3 = \infty$ | $d_3 = 6.8$ | $n_2 = 1.80610$ | $\nu_2 = 40.95$ |
| $r_4 = -2.0700$ | $d_4 = 0.5000$ | | |
| $r_5 = 5.6020$ | $d_5 = 1.7400$ | $n_3 = 1.64000$ | $\nu_3 = 60.09$ |
| $r_6 = -2.4830$ | $d_6 = 0.4300$ | $n_4 = 1.84666$ | $\nu_4 = 23.88$ |
| $r_7 = -27.4420$ | $d_7 = 2.9200$ | | |
| $r_8 = -2.1630$ | $d_8 = 1.0000$ | $n_5 = 1.62004$ | $\nu_5 = 36.25$ |
| $r_9 = \infty$ | $d_9 = 0.9800$ | $n_6 = 1.78800$ | $\nu_6 = 47.43$ |
| $r_{10} = -3.1440$ | | | |

$$f = 1.80, \frac{|f_1|}{f} = 0.63$$

$$\frac{|R_c|}{f} = \frac{|r_6|}{f} = 1.37, \frac{R_a}{R_b} = \frac{r_8}{r_{10}} = 0.68$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.037$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

16. An objecitve for an endoscope according to claim 13 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.6800$ | | | |
| | $d_2 = 0.3000$ | | |
| $r_3 = \infty$ | | | |
| | $d_3 = 4.97$ | $n_2 = 1.78800$ | $\nu_2 = 47.43$ |
| $r_4 = -2.3820$ | | | |
| | $d_4 = 0.3100$ | | |
| $r_5 = 4.6400$ | | | |
| | $d_5 = 1.8400$ | $n_3 = 1.63854$ | $\nu_3 = 55.38$ |
| $r_6 = -1.7990$ | | | |
| | $d_6 = 0.6000$ | $n_4 = 1.84666$ | $\nu_4 = 23.88$ |
| $r_7 = -8.0150$ | | | |
| | $d_7 = 1.8300$ | | |
| $r_8 = -1.7750$ | | | |
| | $d_8 = 0.5000$ | $n_5 = 1.72825$ | $\nu_5 = 28.46$ |
| $r_9 = \infty$ | | | |
| | $d_9 = 2.2000$ | $n_6 = 1.77250$ | $\nu_6 = 49.66$ |
| $r_{10} = -2.7600$ | | | |

$$f = 1.69, \quad \frac{|f_1|}{f} = 0.51$$

$$\frac{|R_c|}{f} = \frac{|r_6|}{f} = 1.06, \quad \frac{R_a}{R_b} = \frac{r_8}{r_{10}} = 0.64$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.079$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

17. An objective for an endoscope according to claim 13 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.5900$ | | | |
| | $d_2 = 0.3000$ | | |
| $r_3 = \infty$ | | | |
| | $d_3 = 3.35$ | $n_2 = 1.78800$ | $\nu_2 = 47.43$ |
| $r_4 = -1.9990$ | | | |
| | $d_4 = 0.3000$ | | |
| $r_5 = 7.0690$ | | | |
| | $d_5 = 1.9435$ | $n_3 = 1.64000$ | $\nu_3 = 60.09$ |
| $r_6 = -1.4710$ | | | |
| | $d_6 = 0.5000$ | $n_4 = 1.84666$ | $\nu_4 = 23.88$ |
| $r_7 = -3.1560$ | | | |
| | $d_7 = 1.8785$ | | |
| $r_8 = -1.4710$ | | | |
| | $d_8 = 0.5000$ | $n_5 = 1.72825$ | $\nu_5 = 28.46$ |
| $r_9 = \infty$ | | | |
| | $d_9 = 1.9902$ | $n_6 = 1.77250$ | $\nu_6 = 49.66$ |
| $r_{10} = -2.6380$ | | | |

$$f = 1.78, \quad \frac{|f_1|}{f} = 0.42$$

$$\frac{|R_c|}{f} = \frac{|r_6|}{f} = 0.82, \quad \frac{R_a}{R_b} = \frac{r_8}{r_{10}} = 0.55$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.121$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

18. An objective for an endoscope according to claim 13 wherein said objective has the following numerical data:

| | | | |
|---|---|---|---|
| $r_1 = \infty$ | | | |
| | $d_1 = 0.2000$ | $n_1 = 1.80610$ | $\nu_1 = 40.95$ |
| $r_2 = 0.7330$ | | | |
| | $d_2 = 0.3000$ | | |
| $r_3 = \infty$ | | | |
| | $d_3 = 4.93$ | $n_2 = 1.80610$ | $\nu_2 = 40.95$ |
| $r_4 = -2.2750$ | | | |
| | $d_4 = 0.1000$ | | |
| $r_5 = 3.5180$ | | | |
| | $d_5 = 1.5900$ | $n_3 = 1.64000$ | $\nu_3 = 60.09$ |
| $r_6 = -1.8770$ | | | |
| | $d_6 = 0.3500$ | $n_4 = 1.84666$ | $\nu_4 = 23.88$ |
| $r_7 = -9.8460$ | | | |
| | $d_7 = 0.9800$ | | |
| $r_8 = -1.6480$ | | | |
| | $d_8 = 0.5300$ | $n_5 = 1.72825$ | $\nu_5 = 28.46$ |
| $r_9 = \infty$ | | | |
| | $d_9 = 1.4100$ | $n_6 = 1.69680$ | $\nu_6 = 55.52$ |
| $r_{10} = -2.2060$ | | | |

$$f = 1.27, \quad \frac{|f_1|}{f} = 0.71$$

$$\frac{|R_c|}{f} = \frac{|r_6|}{f} = 1.46, \quad \frac{R_a}{R_b} = \frac{r_8}{r_{10}} = 0.74$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.070$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

19. An objective for an endoscope according to claim 13 wherein said objective has the following numerical data:

| | | | |
|---|---|---|---|
| $r_1 = \infty$ | | | |
| | $d_1 = 0.2000$ | $n_1 = 1.75700$ | $\nu_1 = 47.87$ |
| $r_2 = 0.9130$ | | | |
| | $d_2 = 0.3000$ | | |
| $r_3 = \infty$ | | | |
| | $d_3 = 6.09$ | $n_2 = 1.80610$ | $\nu_2 = 40.95$ |
| $r_4 = -2.7070$ | | | |
| | $d_4 = 0.5000$ | | |
| $r_5 = 4.2870$ | | | |
| | $d_5 = 1.4300$ | $n_3 = 1.51633$ | $\nu_3 = 64.15$ |
| $r_6 = -2.3730$ | | | |
| | $d_6 = 0.4000$ | $n_4 = 1.84666$ | $\nu_4 = 23.88$ |
| $r_7 = -7.3700$ | | | |
| | $d_7 = 0.9200$ | | |
| $r_8 = -2.0470$ | | | |
| | $d_8 = 0.8600$ | $n_5 = 1.69895$ | $\nu_5 = 30.12$ |
| $r_9 = \infty$ | | | |
| | $d_9 = 1.1000$ | $n_6 = 1.75700$ | $\nu_6 = 47.87$ |
| $r_{10} = -2.8310$ | | | |

$$f = 1.68, \quad \frac{|f_1|}{f} = 0.71,$$

$$\frac{|R_c|}{f} = \frac{|r_6|}{f} = 0.40, \quad \frac{R_a}{R_b} = \frac{r_8}{r_{10}} = 0.72,$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.049$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

20. An objective for an endoscope according to claim 13 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.6323$ | | | |
| | $d_2 = 0.3000$ | | |
| $r_3 = \infty$ | | | |
| | $d_3 = 3.7153$ | $n_2 = 1.78800$ | $\nu_2 = 47.43$ |
| $r_4 = -2.2149$ | | | |
| | $d_4 = 0.6295$ | | |
| $r_5 = 6.3945$ | | | |
| | $d_5 = 2.0000$ | $n_3 = 1.64000$ | $\nu_3 = 60.09$ |
| $r_6 = -1.7561$ | | | |
| | $d_6 = 0.5000$ | $n_4 = 1.84666$ | $\nu_4 = 23.88$ |
| $r_7 = -3.6986$ | | | |
| | $d_7 = 2.0353$ | | |
| $r_8 = -1.5615$ | | | |
| | $d_8 = 0.5000$ | $n_5 = 1.72825$ | $\nu_5 = 28.46$ |
| $r_9 = \infty$ | | | |
| | $d_9 = 2.0000$ | $n_6 = 1.77250$ | $\nu_6 = 49.66$ |
| $r_{10} = -2.9074$ | | | |

$$f = 1.90, \quad \frac{|f_1|}{f} = 0.42,$$

$$\frac{|R_c|}{f} = \frac{|r_6|}{f} = 0.92, \quad \frac{R_a}{R_b} = \frac{r_8}{r_{10}} = 0.53,$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.120$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

21. An objective for an endoscope accroding to claim 13 wherein said objective has the following numerical data:

| | | | |
|---|---|---|---|
| $r_1 = \infty$ | | | |
| | $d_1 = 0.2000$ | $n_1 = 1.78800$ | $\nu_1 = 47.43$ |
| $r_2 = 0.6720$ | | | |
| | $d_2 = 0.3000$ | | |
| $r_3 = \infty$ | | | |
| | $d_3 = 4.957$ | $n_2 = 1.78800$ | $\nu_2 = 47.43$ |
| $r_4 = -2.4390$ | | | |
| | $d_4 = 0.1000$ | | |
| $r_5 = 4.3110$ | | | |
| | $d_5 = 1.4100$ | $n_3 = 1.64000$ | $\nu_3 = 60.09$ |
| $r_6 = -1.8420$ | | | |
| | $d_6 = 1.0300$ | $n_4 = 1.84666$ | $\nu_4 = 23.88$ |
| $r_7 = -7.0940$ | | | |
| | $d_7 = 1.7400$ | | |
| $r_8 = -1.8770$ | | | |
| | $d_8 = 0.5900$ | $n_5 = 1.72825$ | $\nu_5 = 28.46$ |
| $r_9 = -6.9230$ | | | |
| | $d_9 = 1.0300$ | $n_6 = 1.77250$ | $\nu_6 = 49.66$ |
| $r_{10} = -2.4390$ | | | |

$$f = 1.31, \quad \frac{|f_1|}{f} = 0.64,$$

$$\frac{|R_c|}{f} = \frac{|r_6|}{f} = 1.39, \quad \frac{R_a}{R_b} = \frac{r_8}{r_{10}} = 0.77,$$

$$\frac{n_a - 1}{n_a} \frac{1}{R_a} + \frac{1 - n_b}{n_b} \frac{1}{R_b} = \frac{n_5 - 1}{n_5} \frac{1}{r_8} +$$

$$\frac{1 - n_6}{n_6} \frac{1}{r_{10}} = -0.046$$

where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

22. An objective for an endoscope according to claim 13 wherein said objective has the following numerical data:

| | | | |
|---|---|---|---|
| $r_1 = \infty$ | | | |
| | $d_1 = 0.2000$ | $n_1 = 1.75700$ | $\nu_1 = 47.87$ |
| $r_2 = 0.9050$ | | | |
| | $d_2 = 0.3000$ | | |
| $r_3 = \infty$ | | | |
| | $d_3 = 5.6400$ | $n_2 = 1.75700$ | $\nu_2 = 47.87$ |
| $r_4 = -2.6190$ | | | |
| | $d_4 = 0.3000$ | | |
| $r_5 = 4.2950$ | | | |
| | $d_5 = 2.0500$ | $n_3 = 1.51633$ | $\nu_3 = 64.15$ |

-continued $r_6 = -2.1660$
$d_6 = 0.4000$  $n_4 = 1.84666$  $\nu_4 = 23.88$
$r_7 = -7.9380$
$d_7 = 2.1800$
$r_8 = -1.9880$
$d_8 = 0.4100$  $n_5 = 1.67270$  $\nu_5 = 32.10$
$r_9 = 5.8970$
$d_9 = 1.1000$  $n_6 = 1.80610$  $\nu_6 = 40.95$
$r_{10} = -2.7420$ $f = 1.81, \quad \frac{|f_1|}{f} = 0.65,$ $\frac{|R_c|}{f} = \frac{|r_6|}{f} = 0.19, \frac{R_a}{R_b} = \frac{r_8}{r_{10}} = 0.72,$ $\frac{n_a - 1}{n_a} \frac{1}{R_a} + \frac{1 - n_b}{n_b} \frac{1}{R_b} = \frac{n_5 - 1}{n_5} \frac{1}{r_8} +$ $\frac{1 - n_6}{n_6} \frac{1}{r_{10}} = -0.040$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

23. An objective for an endoscope according to claim 13 wherein said objective has the following numerical data:

$r_0 = \infty$
$d_0 = 0.3000$  $n_0 = 1.51633$  $\nu_0 = 64.15$
$r'_0 = \infty$
$d'_0 = 0.2000$
$r_1 = \infty$
$d_1 = 0.2000$  $n_1 = 1.80610$  $\nu_1 = 40.95$
$r_2 = 0.7605$
$d_2 = 0.3000$
$r_3 = \infty$
$d_3 = 7.6000$  $n_2 = 1.78800$  $\nu_2 = 47.43$
$r_4 = -3.3709$
$d_4 = 0.1000$
$r_5 = 3.2819$
$d_5 = 1.3089$  $n_3 = 1.60311$  $\nu_3 = 60.70$
$r_6 = -3.2819$
$d_6 = 1.8392$  $n_4 = 1.78472$  $\nu_4 = 25.71$
$r_7 = \infty$
$d_7 = 1.5075$
$r_8 = -2.0629$
$d_8 = 1.3313$  $n_5 = 1.78472$  $\nu_5 = 25.71$
$r_9 = \infty$
$d_9 = 1.2847$  $n_6 = 1.78800$  $\nu_6 = 47.43$
$r_{10} = -3.3628$ $f = 1.432, \quad \frac{|f_1|}{f} = 0.658$ $\frac{|R_c|}{f} = \frac{|r_6|}{f} = 2.291, \frac{R_a}{R_b} = \frac{r_8}{10} = 0.6134$ -continued $\frac{n_a - 1}{n_a} \frac{1}{R_a} + \frac{1 - n_b}{n_b} \frac{1}{R_b} = \frac{n_5 - 1}{n_5} \frac{1}{r_8} +$ $\frac{1 - n_6}{n_6} \frac{1}{r_{10}} = -0.082$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

24. An objective for an endoscope according to claim 13 wherein said objective has the following numerical data:

$r_0 = \infty$
$d_0 = 0.3000$  $n_0 = 1.51633$  $\nu_0 = 64.15$
$r'_0 = \infty$
$d'_0 = 0.2000$
$r_1 = \infty$
$d_1 = 0.2000$  $n_1 = 1.80610$  $\nu_1 = 40.95$
$r_2 = 0.7250$
$d_2 = 0.3000$
$r_3 = \infty$
$d_3 = 7.6000$  $n_2 = 1.78800$  $\nu_2 = 47.43$
$r_4 = -3.2030$
$d_4 = 0.1000$
$r_5 = 2.7600$
$d_5 = 1.7800$  $n_3 = 1.62041$  $\nu_3 = 60.27$
$r_6 = -3.1440$
$d_6 = 0.7000$  $n_4 = 1.84666$  $\nu_4 = 23.88$
$r_7 = 14.1130$
$d_7 = 1.3100$
$r_8 = -1.8150$
$d_8 = 1.5400$  $n_5 = 1.76182$  $\nu_5 = 26.55$
$r_9 = \infty$
$d_9 = 1.3900$  $n_6 = 1.78800$  $\nu_6 = 47.43$
$r_{10} = -3.2700$ $f = 1.404, \quad \frac{|f_1|}{f} = 0.640$ $\frac{|R_c|}{f} = \frac{|r_6|}{f} = 2.239, \frac{R_a}{R_b} = \frac{r_8}{r_{10}} = 0.555$ $\frac{n_a - 1}{n_a} \frac{1}{R_a} + \frac{1 - n_b}{n_b} \frac{1}{R_b} = \frac{n_5 - 1}{n_5} \frac{1}{r_8} +$ $\frac{1 - n_6}{n_6} \frac{1}{r_{10}} = -0.103$ where, reference symbols $r_1$ through $r_{10}$ respectively represent radii of curvature of respective lens surfaces, reference symbols $d_1$ through $d_9$ respectively represent thicknesses of respective lenses and airspaces between respective lenses, reference symbols $n_1$ through $n_6$ respectively represent refractive indices of respective lenses, and reference symbols $\nu_1$ through $\nu_6$ respectively represent Abbe's numbers of respective lenses.

* * * * *